US011223882B2

(12) United States Patent
Ferren et al.

(10) Patent No.: US 11,223,882 B2
(45) Date of Patent: *Jan. 11, 2022

(54) TECHNIQUES FOR ACOUSTIC MANAGEMENT OF ENTERTAINMENT DEVICES AND SYSTEMS

(71) Applicant: INTEL CORPORATION, Santa Clara, CA (US)

(72) Inventors: Bran Ferren, Beverly Hills, CA (US); Cory J. Booth, Beaverton, OR (US); David B. Andersen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,920

(22) Filed: Apr. 13, 2020

(65) Prior Publication Data

US 2021/0006869 A1    Jan. 7, 2021

Related U.S. Application Data

(63) Continuation of application No. 15/722,364, filed on Oct. 2, 2017, now Pat. No. 10,631,065, which is a
(Continued)

(51) Int. Cl.
*H04N 21/63* (2011.01)
*H04N 21/437* (2011.01)
(Continued)

(52) U.S. Cl.
CPC ............ *H04N 21/632* (2013.01); *G01S 5/20* (2013.01); *G06F 3/017* (2013.01); *G06F 3/0346* (2013.01);
(Continued)

(58) Field of Classification Search
CPC ............ H04S 7/301–303; G06F 3/167; G06F 2203/04804; G06F 3/017; G06F 3/0346;
(Continued)

(56) References Cited

U.S. PATENT DOCUMENTS 5,267,323 A * 11/1993 Kimura .................. G08C 23/04
381/110
5,848,163 A   12/1998 Gopalakrishnan et al.
(Continued)

FOREIGN PATENT DOCUMENTS

WO       2005078678         8/2005

OTHER PUBLICATIONS

International Searching Authority, "International Search Report and Written Opinion," mailed in connection with International Patent Application No. PCT/US2011/049292, dated Feb. 28, 2012, 11 pages.
(Continued)

*Primary Examiner* — Sisay Yacob
(74) *Attorney, Agent, or Firm* — Hanley, Flight & Zimmerman, LLC

(57) ABSTRACT

Techniques for acoustic management of entertainment devices and systems are described. Various embodiments may include techniques for acoustically determining a location of a remote control or other entertainment device. Some embodiments may include techniques for controlling one or more entertainment components using voice commands or other acoustic information. Other embodiments may include techniques for establishing a voice connection using a remote control device. Other embodiments are described and claimed.

27 Claims, 23 Drawing Sheets

Related U.S. Application Data continuation of application No. 13/819,306, filed as application No. PCT/US2011/049292 on Aug. 26, 2011, now Pat. No. 9,781,484.

(60) Provisional application No. 61/377,588, filed on Aug. 27, 2010.

(51) Int. Cl.

| | | |
|---|---|---|
| H04N 21/422 | (2011.01) | |
| H04N 21/443 | (2011.01) | |
| H04N 21/482 | (2011.01) | |
| H04N 21/4147 | (2011.01) | |
| H04N 21/433 | (2011.01) | |
| H04N 21/431 | (2011.01) | |
| H04N 21/436 | (2011.01) | |
| H04N 21/488 | (2011.01) | |
| H04N 21/654 | (2011.01) | |
| H04N 5/445 | (2011.01) | |
| G06F 3/041 | (2006.01) | |
| G06F 3/01 | (2006.01) | |
| G06F 3/0482 | (2013.01) | |
| G06F 3/0484 | (2013.01) | |
| G06F 3/048 | (2013.01) | |
| G08C 17/00 | (2006.01) | |
| G08C 17/02 | (2006.01) | |
| G08C 19/00 | (2006.01) | |
| G06K 9/32 | (2006.01) | |
| H04N 21/45 | (2011.01) | |
| G06N 5/02 | (2006.01) | |
| G01S 5/20 | (2006.01) | |
| H04N 5/91 | (2006.01) | |
| G06F 3/0485 | (2013.01) | |
| H04L 29/06 | (2006.01) | |
| G06Q 30/02 | (2012.01) | |
| G06F 3/038 | (2013.01) | |
| G06F 3/0481 | (2013.01) | |
| G06F 3/0346 | (2013.01) | |
| H04N 21/475 | (2011.01) | |
| H04N 21/81 | (2011.01) | |

(52) U.S. Cl.
CPC ............ *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0484* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G06F 2203/04804* (2013.01); *G08C 2201/32* (2013.01); *G08C 2201/40* (2013.01); *H04N 21/4755* (2013.01); *H04N 21/8133* (2013.01)

(58) Field of Classification Search
CPC ...... G06F 3/0383; G06F 3/041; G06F 3/0414; G06F 3/048; G06F 3/0481; G06F 3/0482; G06F 3/0484; G06F 3/0485; G01S 5/20; G06K 9/3266; G06N 5/02; G06Q 30/0201; G08C 17/00; G08C 17/02; G08C 19/00; G08C 2201/32; G08C 2201/40; H04L 65/403; H04N 21/4147; H04N 21/42204; H04N 21/42222; H04N 21/4312; H04N 21/4333; H04N 21/43615; H04N 21/437; H04N 21/4432; H04N 21/4436; H04N 21/4508; H04N 21/4516; H04N 21/4532; H04N 21/4755; H04N 21/482; H04N 21/4882; H04N 21/63; H04N 21/632; H04N 21/654; H04N 21/8133; H04N 5/44504; H04N 5/91

See application file for complete search history.

(56) References Cited

U.S. PATENT DOCUMENTS

| | | | |
|---|---|---|---|
| 6,069,567 A * | 5/2000 | Zawilski | H04B 1/202 340/12.24 |
| 6,449,485 B1 | 9/2002 | Anzil | |
| 7,928,961 B2 | 4/2011 | Garfio et al. | |
| 9,781,484 B2 | 10/2017 | Ferren et al. | |
| 10,631,065 B2 | 4/2020 | Ferren et al. | |
| 2002/0138263 A1 | 9/2002 | Deligne et al. | |
| 2004/0066940 A1 | 4/2004 | Amir | |
| 2004/0099735 A1 | 5/2004 | Neumark | |
| 2004/0230904 A1 | 11/2004 | Tada | |
| 2005/0144009 A1 | 6/2005 | Rodriguez et al. | |
| 2006/0028337 A1 | 2/2006 | Li | |
| 2006/0088174 A1 | 4/2006 | DeLeeuw et al. | |
| 2007/0159924 A1 | 7/2007 | Vook et al. | |
| 2007/0173212 A1 | 7/2007 | Mergler | |
| 2008/0082326 A1 * | 4/2008 | Venkataraman | G10L 15/20 704/228 |
| 2008/0172221 A1 * | 7/2008 | Jacoby | G10L 15/20 704/200 |
| 2008/0204605 A1 | 8/2008 | Tsai | |
| 2008/0278635 A1 * | 11/2008 | Hardacker | H04N 21/41265 348/734 |
| 2009/0323991 A1 | 12/2009 | Hudson et al. | |
| 2010/0053466 A1 | 3/2010 | Naka et al. | |
| 2010/0199296 A1 | 8/2010 | Lee et al. | |
| 2012/0075957 A1 | 3/2012 | De Bruijn | |
| 2012/0320272 A1 | 12/2012 | Schmehl et al. | |
| 2013/0177016 A1 | 7/2013 | Nakano et al. | |
| 2013/0197917 A1 * | 8/2013 | Dong | G10L 21/0216 704/275 |

OTHER PUBLICATIONS

Korean Intellectual Property Office, "Notice of Preliminary Rejection," mailed in connection with Korean Patent Application No. 10-2013-7007837, dated Jul. 31, 2014, 9 pages.

European Patent Office, "Communication Pursuant to Article 94(3) EPC," mailed in connection with European Patent Application No. 11820708.3, dated Apr. 5, 2016, 8 pages.

United States Patent and Trademark Office, "Notice of Allowance," mailed in connection with U.S. Appl. No. 15/722,364, dated Dec. 13, 2019, 9 pages.

United States Patent and Trademark Office, "Advisory Action," mailed in connection with U.S. Appl. No. 15/722,364, dated Jul. 30, 2019, 2 pages.

United States Patent and Trademark Office, "Final Office Action," mailed in connection with U.S. Appl. No. 15/722,364, dated Apr. 18, 2019, 18 pages.

(56) References Cited

OTHER PUBLICATIONS

United States Patent and Trademark Office, "Non-final Office Action," mailed in connection with U.S. Appl. No. 15/722,364, dated Nov. 2, 2018, 13 pages.
United States Patent and Trademark Office, "Notice of Allowance," mailed in connection with U.S. Appl. No. 13/819,306, dated May 25, 2017, 14 pages.
United States Patent and Trademark Office, "Non-final Office Action," mailed in connection with U.S. Appl. No. 13/819,306, dated Nov. 25, 2016, 14 pages.
United States Patent and Trademark Office, "Final Office Action," mailed in connection with U.S. Appl. No. 13/819,306, dated Jun. 27, 2016, 15 pages.
United States Patent and Trademark Office, "Non-final Office Action," mailed in connection with U.S. Appl. No. 13/819,306, dated Jan. 13, 2016, 13 pages.
European Patent Office, "Communication Pursuant to Article 94(3) EPC," mailed in connection with European Patent Application No. 11820708.3, dated Dec. 23, 2016, 7 pages.

* cited by examiner

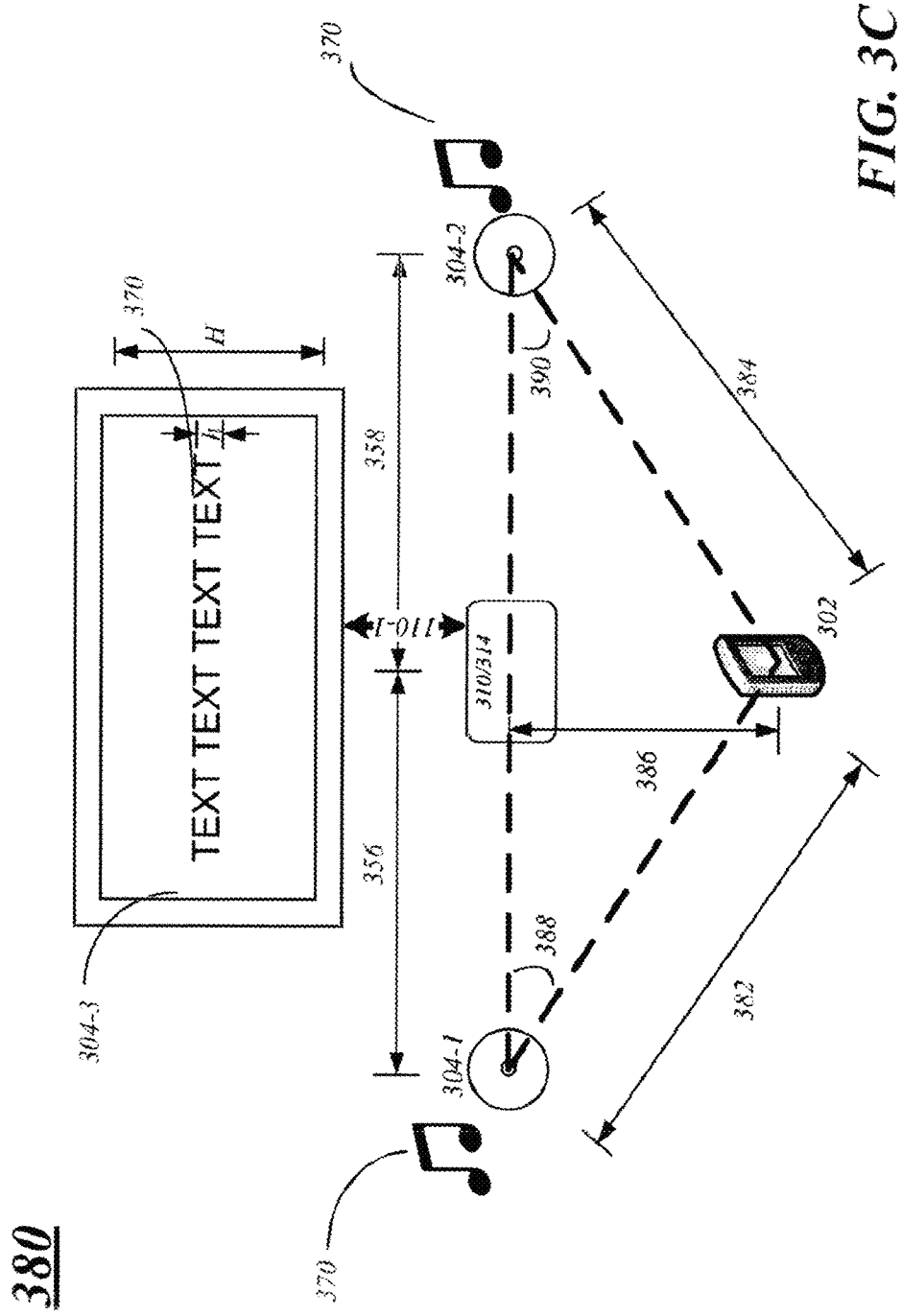

400

- PROVIDE A CONTROL DIRECTIVE TO AN ENTERTAINMENT DEVICE OPERATIVE TO PROVIDE ONE OR MORE ACOUSTIC SIGNALS TO TWO OR MORE SPATIALLY DISTINCT ACOUSTIC REPRODUCTION DEVICES
402

- RECEIVE ACOUSTIC RELAY INFORMATION FROM A REMOTE CONTROL DEVICE OPERATIVE TO RECEIVE ONE OR MORE ACOUSTIC SOUND WAVES PRODUCED FROM THE TWO OR MORE SPATIALLY DISTINCT ACOUSTIC REPRODUCTION DEVICES
404

- DETERMINE A LOCATION OF THE REMOTE CONTROL DEVICE BASED ON THE ONE OR MORE ACOUSTIC SIGNALS AND THE ACOUSTIC RELAY INFORMATION
406

- PROVIDE A CONTROL DIRECTIVE TO THE ENTERTAINMENT DEVICE OPERATIVE TO ADJUST ONE OR MORE ENTERTAINMNET PARAMETERS BASED ON THE DETERMINED LOCATION
408

CORRELATE THE ONE OR MORE ACOUSTIC SIGNALS AND THE ACOUSTIC RELAY INFORMATION
410

DETERMINE A TRANSMISSION TIME FOR THE ONE OR MORE ACOUSTIC SIGNALS FROM EACH OF THE TWO OR MORE SPATIALLY DISTINCT ACOUSTIC REPRODUCTION DEVICES TO THE REMOTE CONTROL DEVICE
412

DETERMINE A DISTANCE BASED ON THE DETERMINED TRANSMISSION TIME
414

TRIANGULATE A LOCATION OF THE REMOTE CONTROL DEVICE BASED ON THE DETERMINED DISTANCES
416

*FIG. 4B*

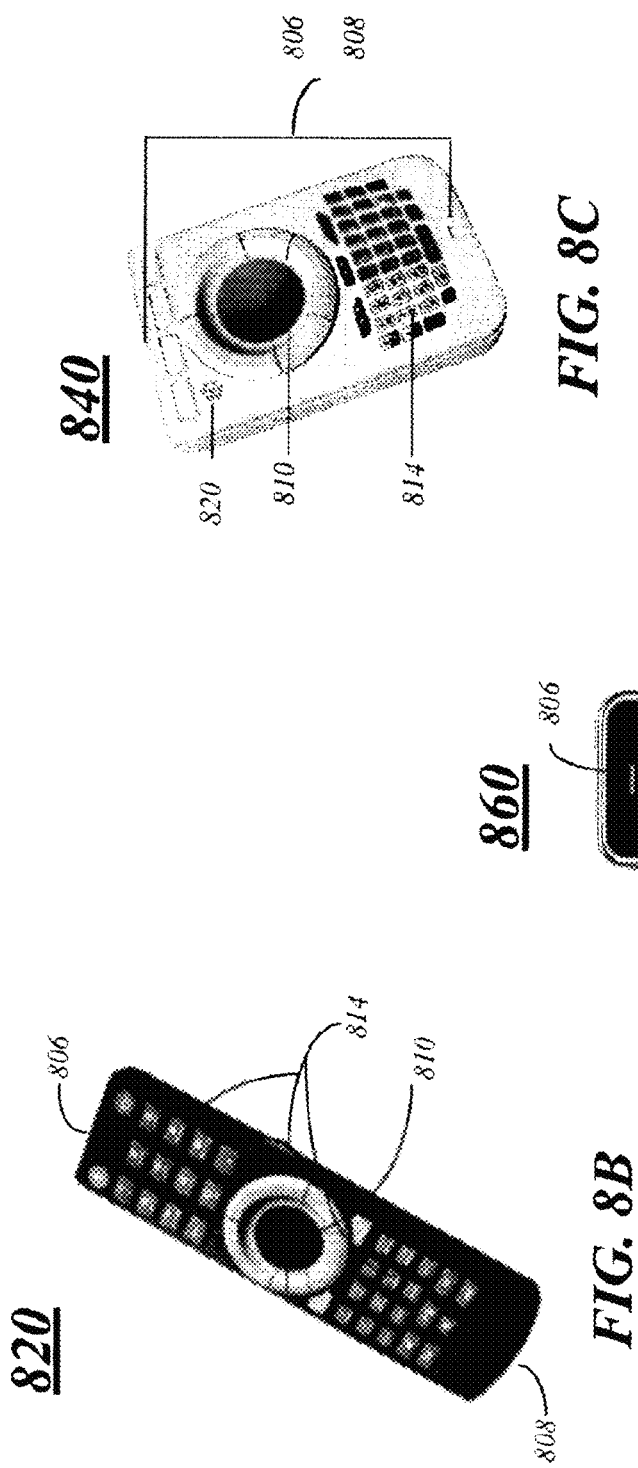

TECHNIQUES FOR ACOUSTIC MANAGEMENT OF ENTERTAINMENT DEVICES AND SYSTEMS

CROSS-REFERENCE TO RELATED APPLICATIONS

This application is a continuation of, claims the benefit of and priority to previously filed U.S. patent application Ser. No. 15/722,364 filed Oct. 2, 2017, entitled "TECHNIQUES FOR ACOUSTIC MANAGEMENT OF ENTERTAINMENT DEVICES AND SYSTEMS", which is a continuation of, claims the benefit of and priority to previously filed U.S. patent application Ser. No. 13/819,306 filed Feb. 26, 2013, patented on Oct. 3, 2017 under U.S. Pat. No. 9,781,484, which is a is a national stage application claiming the benefit of and priority to International Application No. PCT/US2011/049292 filed Aug. 26, 2011, which claims the benefit of and priority to previously filed U.S. Provisional Patent Application Ser. No. 61/377,588 filed Aug. 27, 2010, which are hereby incorporated by reference in their entireties.

BACKGROUND

Remote control devices and other mobile computing devices are becoming increasingly important components of modern home entertainment and computing systems. For example, an increasing number of electronic devices are offering speech recognition capability as a control interface to the device. A common challenge in such systems is reliable recognition of spoken commands in the presence of background and other ambient noise. Reliable speech recognition by a remote control or other mobile computing device in a home entertainment system is made particularly difficult by the possible presence of programming dialog before, after or concurrent with a spoken command. Consequently, a need exists for improved speech recognition techniques.

Despite the evolution of home entertainment and computing systems, many problems persist. For example, variations in volume levels within television programming can prove frustrating to a viewer. In particular, the volume of programming content that may be of less interest to the user, such as commercials, often exceeds that of the primary programming. Many users find the volume levels during commercials agonizingly loud. Furthermore, a pleasant user experience is becoming an increasingly important consideration when designing modern systems. Consequently, a need exists for improved acoustic management.

In many instances, it may be helpful for a home entertainment or other computing system to know the current position of a viewer or user of the system. For example, it may be particularly useful to know a distance between a viewer and a display. Furthermore, with knowledge of the viewing distance, the display size, and any number of other relevant parameters, a modern entertainment or computing system may be capable of, for example, adjusting one or more entertainment parameters to enhance the entertainment experience. While direct measurement of the viewer's position relative to the display is possible using a stereo vision calculation, biometric measurements or other techniques, obtaining reliable measurements remains difficult. Furthermore, every home entertainment user has experienced the frustration of a misplaced remote control. Current entertainment and computing systems fail to adequately aid users who cannot locate one or more components of the system. Consequently, a need exists for improved acoustic location management. Accordingly, there may be a need for improved techniques to solve these and other problems.

BRIEF DESCRIPTION OF THE DRAWINGS

FIG. 3C illustrates one embodiment of a media processing system.
FIG. 4A illustrates one embodiment of a logic flow.
FIG. 4B illustrates one embodiment of a logic flow.
FIG. 8B illustrates one embodiment of an apparatus.
FIG. 8C illustrates one embodiment of an apparatus.
FIG. 8D illustrates one embodiment of an apparatus.

DETAILED DESCRIPTION

Figure 1:
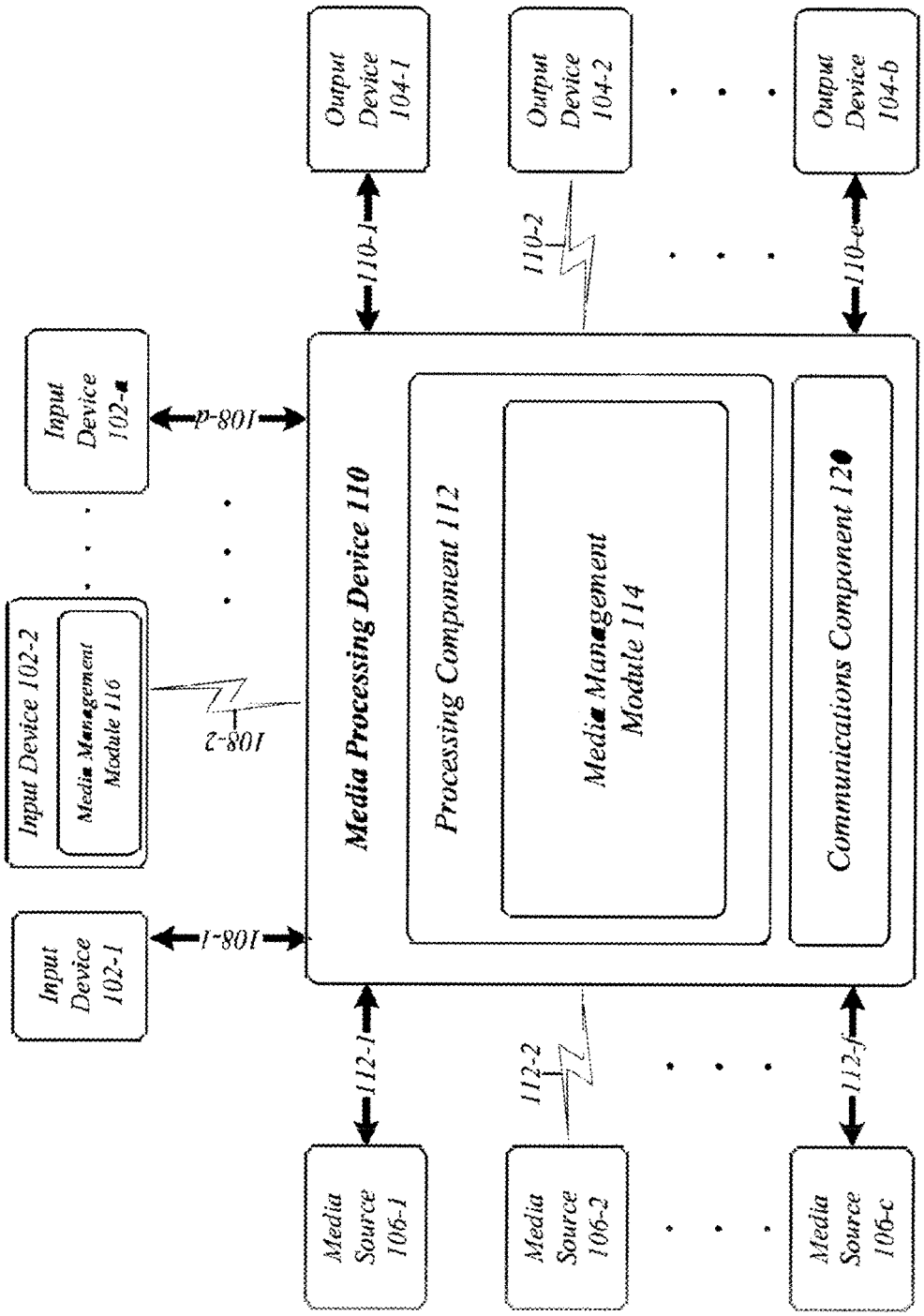
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation tool allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to techniques for acoustic management of entertainment devices and systems. In one embodiment, for example, an apparatus may comprise a media management module operative to send a control directive to an entertainment device operative to provide one or more acoustic signals to two or more spatially distinct acoustic reproduction devices and a transceiver operative to receive acoustic relay information from a remote control device operative to receive one or more acoustic sound waves produced from the one or more acoustic signals by the two or more spatially distinct acoustic reproduction devices. In various embodiments, the media management module may be operative to determine a location of the remote control device based on the one or more acoustic signals and the acoustic relay information and to send a control directive to adjust one or more entertainment parameters based on the determined location.

In some embodiments, an apparatus may comprise a media management module operative to receive an indication that a remote control device is initiating voice control, a wireless transceiver operative to receive acoustic information from the remote control device and the media management module may be operative to subtract a programming audio signal from the received acoustic information to identify a voice command signal in the acoustic information and to send a control directive to adjust one or more entertainment parameters of an entertainment system based on the voice command signal.

In various embodiments, an apparatus may comprise an enclosure, a plurality of microphones, a media management module coupled to the plurality of microphones and a transceiver coupled to the media management module. In some embodiments, the media management module may be operative to receive acoustic information from one or more of the plurality of microphones and to generate an acoustic management signal and the transceiver may be operative to transmit the acoustic management signal to an entertainment device that is operative to adjust one or more entertainment parameters based on the acoustic management signal. Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols.

A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-$a$, one or more output devices 104-$b$, and one or more media sources 106-$c$. The media processing device 110 may be communicatively coupled to the input devices 102-$a$, the output devices 104-$b$, and the media sources 106-$c$ via respective wireless or wired communications connections 108-$d$, 110-$e$ and 112-$f$.

It is worthy to note that "a" and "b" and "c" and similar designators as used herein are intended to be variables representing any positive integer. Thus, for example, if an implementation sets a value for a=5, then a complete set of input devices 102-$a$ may include computing devices 102-1, 102-2, 102-3, 102-4 and 102-5. The embodiments are not limited in this context.

In various embodiments, the media processing system 100 may include one or more input devices 102-$a$. In general, each input device 102-$a$ may comprise any component or device capable of providing information to the media processing device 110. Examples of input devices 102-$a$ may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-$b$. An output device 104-$b$ may comprise any electronic device capable of reproducing, rendering or presenting media content for consumption by a human being. Examples of output devices 104-$b$ may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise or include media management module 114. Media management module 114 is shown as part of media processing device 110 for purposes of illustration and not limitation. It should be understood that media management module 114 could be located in other devices, components or nodes of media processing system 100 in various embodiments and still fall within the described embodiments. For example, input device 102-2 may include media management module 116 which may be the same or similar to media management module 114. The embodiments are not limited in this context.

Figure 2:
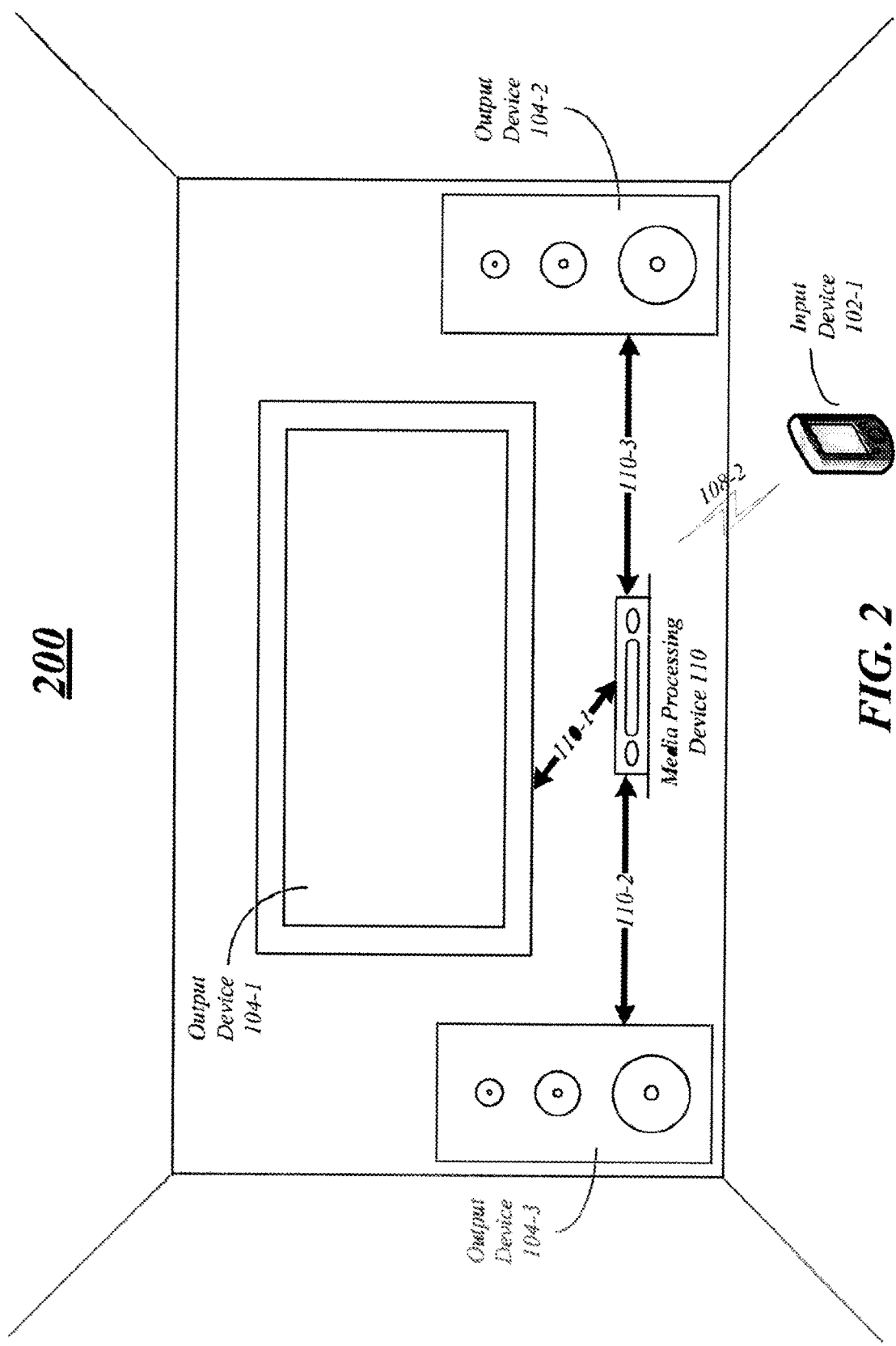
FIG. 2 illustrates one embodiment of a media processing system.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers or other acoustic reproduction devices arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

In various embodiments it may be helpful for the digital home systems of FIGS. 1 and 2 to know the current position of a viewer. For example, it may be especially helpful to know the distance between a viewer and a display. With knowledge of the viewing distance, the display size, and any other suitable entertainment parameters as described elsewhere herein, the digital home system may be operative to adjust the pitch of text within on-screen text overlays to ensure readability from the current viewing distance or adjust any other suitable entertainment parameter to enhance the entertainment experience. While direct measurement of the viewer's position relative to the display is possible using techniques such as stereo vision calculation or biometric measurements, obtaining reliable measurements can be difficult.

To determine the position of the viewer, the digital home system may be operative to use knowledge of the programming audio and digital signal processing to perform time-of-flight measurements between the audio system speakers and the remote control to calculate the position of the remote control and may use the position of the remote control as a proxy for the position of the viewer in various embodiments. More specifically, in some embodiments the remote control may be operative to relay the audio signals measured by one or more onboard microphones back to the digital home system via a wireless link. Upon receipt, the digital home system may be operative to correlate the measured signals with a recent history of program audio routed to each of the speakers and, accounting for the delay associated with relaying the measured signal, the digital home system may be operative to determine the time of flight from each speaker to the remote control and calculate a distance corresponding to each time of flight and using the distances calculate the location of the remote control. Various embodiments described herein include reference to triangulation of the location of the remote control device. It should be understood that the embodiments are not limited in this context and any suitable location determination method may be used and still fall within the described embodiments. For example, multilateration, hyperbolic positioning, trilateration, parallax, resection or any other suitable location determination method may be used. Other embodiments are described and claimed.

Figure 3A:
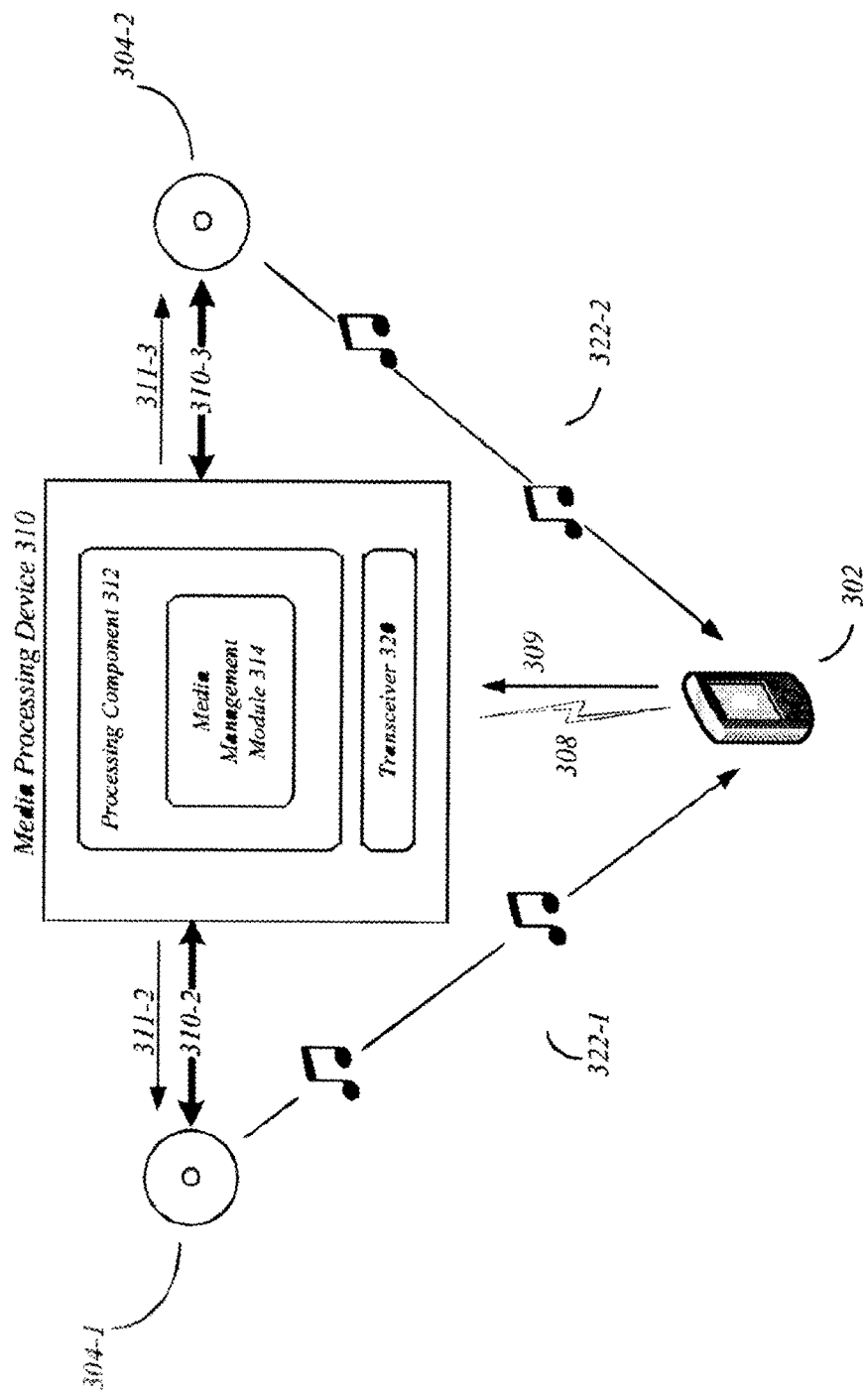
FIG. 3A illustrates one embodiment of a media processing system.

FIG. 3A illustrates a block diagram for a media processing system 300 that may be the same or similar to media processing systems 100 of FIG. 1 and 200 of FIG. 2 where like elements are similarly numbered. The media processing system 300 may comprise a sample digital home system implementation that is arranged to acoustically determine the location of a remote control device in some embodiments. Although the media processing system 300 shown in FIG. 3A has a limited number of elements in a certain topology, it may be appreciated that the media processing system 300 may include more or less elements in alternate topologies as desired for a given implementation. The embodiments are not limited in this context.

In the illustrated embodiment shown in FIG. 3A, the media processing system 300 may comprise a media processing device 310, input device 302 and output devices 304-1 and 304-2. The media processing device 310 may be communicatively coupled to the input device 302 and the output devices 304-1 and 304-2 via respective wireless or wired communications connections 310-2, 310-3 and 308. For purposes of illustration and not limitation, the output devices 304-1 and 304-2 may comprise speakers or other acoustic reproduction devices and the input device 302 may comprise a remote control device.

Media processing device 110 may comprise or include media management module 314 in some embodiments. For example, media processing device 310 may comprise a processing component 312 or processor arranged to execute the media management module 314. In various embodiments, media management module 314 may be operative to send a control directive to an entertainment device operative to provide one or more acoustic signals 311-2 and 311-3 to two or more spatially distinct acoustic reproduction devices. For example, media management module 314 may send a control directive to processing component 312 or media processing device 310 that is operative to provide one or more acoustic signals 311-1 and 311-2 to acoustic reproduction devices 304-1 and 304-2 via connections 310-2 and 310-3. In some embodiments, acoustic reproduction devices 304-1 and 304-2 may comprise any suitable electroacoustic transducer that produces sound in response to an electrical audio signal input. Although not limited in this respect, the acoustic reproduction devices 304-1 and 304-2 may comprise stereo speakers in some embodiments.

In various embodiments, the acoustic signals 311-1 and 311-2 may comprise any suitable electrical audio signal capable of being reproduced or transmitted by the speakers 304-1 and 304-2 as acoustic sound waves 322-1 and 322-2 respectively. In some embodiments, the one or more acoustic signals 311-1 and 311-2 may comprise acoustic entertainment signals or acoustic calibration signals. Acoustic entertainment signals may comprise signals that are intended for user consumption, including but not limited to music, multimedia audio, television audio or other acoustic sounds. In some embodiments, acoustic calibration signals may comprise one or more impulses, chirps or swoops comprising inaudible ultrasonic frequencies that are inaudible or substantially inaudible to human hearing systems that are used to calibrate different components of the digital home system 300. Other embodiments are described and claimed.

In some embodiments, remote control device 302 may be operative to receive the acoustic sound waves 322-1 and 322-2 produced from the one or more acoustic signals 311-1 and 311-2 by the two or more spatially distinct acoustic reproduction devices 304-1 and 304-2. For example, remote control device 302 may include one or more microphones (not shown) capable of receiving the acoustic sound waves 322-1 and 322-2. While not shown in FIG. 3, remote control device 302 (e.g. input device 102-2 of FIG. 1) may also include a media management module or other logic that is operative to receive, perform one or more actions or calculations involving, and relay the acoustic sound waves 322-1 and 322-2 via wireless connection 308 as relay information 309. In various embodiments, the media management module of remote control device 302 may be operative to convert the acoustic sound waves 322-1 and 322-2 to digital signals, correlate the signals, add time stamps to the signals or perform any other suitable action before transmitting or relaying the signals in the form of relay information 309 to media processing device 310.

In various embodiments, media processing device 310 may include a transceiver 320 operative to receive the acoustic relay information 309 from remote control device 302. In some embodiments, transceiver 320 may be coupled to and operative to provide the acoustic relay information 309 to media management module 314 for further processing. Transceiver 320 may comprise or be operative to receive the relay information 309 over any suitable connection type 308, including but not limited to infra-red, Bluetooth, WiFi, WLAN or any other suitable wireless connectivity technology. The embodiments are not limited in this respect.

The media management module 314 may be operative to determine a location of the remote control device 302 in some embodiments. For example, media management module 314 may be operative to determine a location of the remote control device 302 based on the one or more acoustic signals 311-3 and 311-3, the one or more acoustic sound waves 322-1 and 322-2 or the acoustic relay information 309 in various embodiments. In some embodiments, the media management module 314 may be operative to correlate the one or more acoustic signals 311-2 and 311-3, the one or more acoustic sound waves 322-2 and 322-2 and the acoustic relay information 309 to determine a transmission time for the one or more acoustic sound waves 322-1 and 322-2 from each of the two or more spatially distinct acoustic reproduction devices 304-1 and 322-2 to the remote control device 302. In various embodiments, transmission time may comprise a time of flight or other measurement of the time that it takes for the acoustic sound waves 322-1 and 322-2 to travel a distance through a medium such as air.

In some embodiments, remote control device 302 and media processing device 310 may include synchronized clocks that allow for accurate time stamping of information relayed between the two devices. For example, remote control device 302 may be operative to record the time when the acoustic sound waves 322-1 and 322-2 are received and may include this information with relay information 309. Media management module 314 may also be operative to record the time when the acoustic information 311-2 and 311-3 is generated or reproduced. Based on these times, media management module 314 may be operative to determine a transmission time for the acoustic sound waves 322-1 and 322-2.

In various embodiments delay may be present in the system 300 and may need to be accounted for to ensure accurate distance measurements. For example, there may be a delay associated with transmitted the acoustic information 311-2 and 311-3 from the media processing device 310 to the acoustic reproduction devices 304-1 and 304-2. Similarly, there may be a delay associated with remote control device 302 receiving, processing and relaying the acoustic information as relay information 309. In some embodiments, media management module 314 may be operative to calculate a first delay associated with the one or more acoustic signals 311-2 and 311-3 and a second delay associated with the acoustic relay information 309 and may account for the delays when correlating the one or more acoustic signals 311-2 and 311-3, the one or more acoustic sound waves 322-1 and 322-2 and the acoustic relay information 309.

Figure 3B:
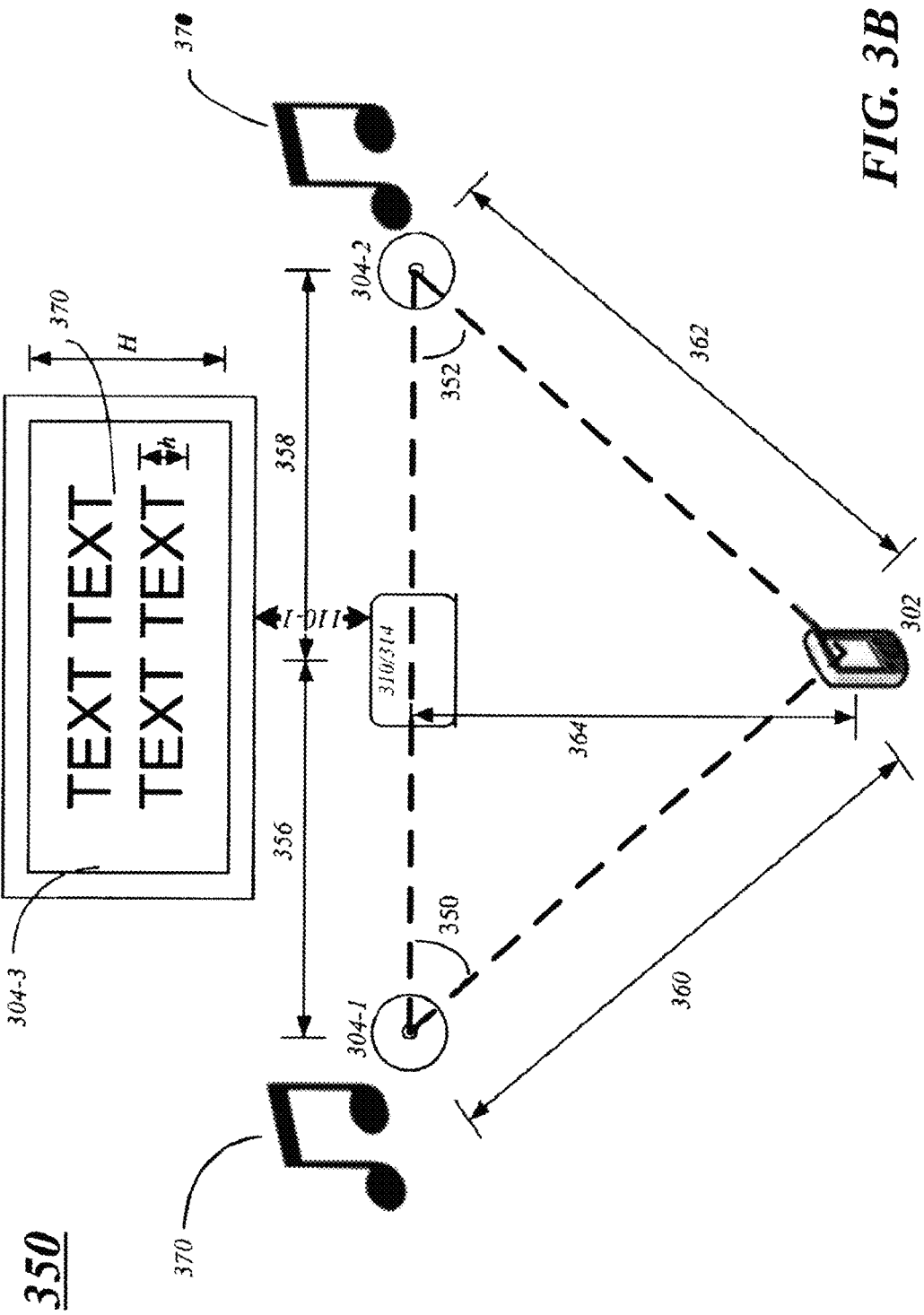
FIG. 3B illustrates one embodiment of a media processing system.

FIG. 3B and FIG. 3C illustrate block diagrams for media processing systems 350 and 380 respectively that may be the same or similar to media processing systems 100 of FIG. 1, 200 of FIG. 2 and 300 of FIG. 3A where like elements are similarly numbered. The media processing systems 350 and 380 may comprise sample digital home system implementations that are arranged to acoustically determine the location of a remote control device in some embodiments. Although the media processing systems 350 and 380 shown in FIGS. 3B and 3C have a limited number of elements in a certain topology, it may be appreciated that the media processing systems 350 and 380 may include more or less elements in alternate topologies as desired for a given implementation. The embodiments are not limited in this context.

In the illustrated embodiments shown in FIGS. 3B and 3C, the media processing systems 350 and 380 may comprise a media processing device 310, input device 302 and output devices 304-1 and 304-2. The media processing device 310 may be communicatively coupled to the input device 302 and the output devices 304-1 and 304-2 via respective wireless or wired communications as previously described with reference to FIGS. 1, 2 and 3A. Media processing device 310 may also be communicatively coupled to output device 304-2 via communication connection 110-1 in some embodiments. In various embodiments, output device 304-3 may comprise a digital display operative to reproduce one or more graphical user interface (GUI) elements and acoustic reproduction device 304-1 and 304-2 may be operative to reproduce acoustic sounds. In some embodiments, the GUI element and acoustic sounds 370 may comprise examples of entertainment parameters that are adjusted, modulated or otherwise controlled by media processing device 310. Other embodiments are described and claimed.

FIGS. 3B and 3C illustrate, in some embodiments, a plurality of distances and angles that may be used, determined or calculated to assist in determining the position of remote control device 302. For example, angles 350, 352, 388 and 390 may comprise angles between the acoustic reproduction devices 304-1 and 304-2 and remote control device 302. In various embodiments, distances 356 and 358 may comprise distances between media processing device 310 and acoustic reproduction devices 304-1 and 304-2. In some embodiments, distances 360, 362, 382 and 384 may comprise distances from the acoustic reproduction devices 304-1 and 304-2 to the remote control device 302 and distances 364 and 386 may comprise distances from the remote control device 302 to the media processing device 310. The distances illustrated in FIGS. 3B and 3C may be calculated or determined based on the above-recited transmission times in some embodiments or may comprise fixed, entered, standard or configured distances.

In various embodiments, media management module 314 may be operative to receive location information for the two or more spatially distinct acoustic reproduction devices 304-1 and 304-2. For example, in some embodiments media management module 314 may have a priori knowledge of the location of two acoustic reproduction devices 304-1 and 304-2 relative to the display 304-3 or the media processing device 310. For example, a user of the systems 350, 380 may have the option of entering locations of the acoustic reproduction devices 304-1 and 304-2 in a configuration utility or the locations may be determined during a calibration procedure.

In some embodiments, media management module 314 is programmed to provide a default location for the remote control device 302 that is in front of the display 304-3 and/or the media processing device 310. By utilizing this assumption, two time-of-flight or transmission time measurements may be sufficient for locating the remote control device 302. In various embodiments, knowledge of additional acoustic reproduction device locations (not shown) may allow media management module 314 to locate remote control device 302 with greater accuracy, without invoking the assumption that the remote control device 302 is in front of the display 304-3, or in three-dimensional space and not merely within a platform projection of the utilized space. Other embodiments are described and claimed.

Media management module 314 may be operative to determine a location for the two or more spatially distinct acoustic reproduction devices 304-1 and 304-2 based on a known location of the remote control device 302 using a calibration procedure or utility in some embodiments. For example, a user may be instructed to place the remote control device 302 at a specific location (known to the 350, 380) relative to the display 304-3. Using measurements of the time of flight and corresponding distances between the remote control device 302 and each acoustic reproduction device 304-1 and 304-2, media management module 314 may be operative to determine the location of each acoustic reproduction device 304-1 and 304-2 relative to the display 304-3 and/or the media processing device 310. In various embodiments, the calibration procedure may enable media management module 314 to make use of assumptions about typical acoustic reproduction device locations (e.g. the front right channel is typically placed to the right of the display along a line parallel to the front surface of the display). In some embodiments, each acoustic reproduction device 304-1 and 304-2 may also incorporate a microphone, allowing the system to measure the time of flight (and therefore) distance between the acoustic reproduction devices 304-1 and 304-2 (e.g. distance 356 plus distance 358). Again invoking assumptions about typical acoustic reproduction device placements (e.g. the center channel is, in a platform projection, essentially coincident with the front surface of the display), media management module 314 may be operative to utilize the pairwise distances to determine the location of the speakers relative to the display 304-3.

Based on the fixed or known position of acoustic reproduction devices 304-1 and 304-2, media processing device 310 and/or display 304-2, media management module 314 may be operative to determine a location of the remote control device 302 based on the determined distances 360, 362, 364, 382, 384 and 386. While certain embodiments describe the determination of the position of remote control device 302 and the distances 364 and 386 with respect to the media processing device 310, it should be understood that distances 364 and 386 may be representative of a distance from remote control device 302 to any suitable component of systems 350 and 380, such as display 304-3. The embodiments are not limited in this context. In various embodiments, any known method, calculation or formula to determine location based on the available distances and angles could be used and still fall within the described embodiments.

In various embodiments, as shown from FIG. 3B to FIB. 3C and vise versa, the relative position of remote control device 302 with respect to media processing device 310 can change while the position of media processing device 310, display 304-3 and acoustic reproduction devices 304-1 and 304-2 remain the same resulting in changes to distances 360, 362, 364, 382, 384 and 386. These changes in distance, particularly the changes in distance between the remote control device 302 and media processing device 310 may be used in some embodiments by media processing device 310 to adjust one or more entertainment parameters 370 of the systems 350 and 380. For example, media processing device 310 or media management module 314 (not shown) may be operative to send a control directive to adjust one or more entertainment parameters 370 based on the determined location or the remote control device 302 in some embodiments.

Entertainment parameters may comprise one or more visual, audio or other sensory perceptible parameters that are controlled or influenced by media processing systems 300, 350, 380. For example, entertainment parameters may comprise the size, color or orientation of GUI elements in a GUI view on display 304-3 in some embodiments. In other embodiments, entertainment parameters may comprise the volume level of acoustic information reproduced by acoustic reproduction devices 304-1 and 304-2. One skilled in the art will understand that any suitable type or number of entertainment parameters are available and the embodiments are not limited to the parameters specifically set forth herein.

Media management module 314 may be operative to send a control directive to adjust one or more entertainment parameters based on the determined location of remote control device 302 in some embodiments. In various embodiments, the entertainment parameter 370 may comprise a GUI element for a GUI view presented on display 304-3 or a volume. For example, a height of on-screen text, h may be adjusted based on the current viewing distance, 364, 386, such that/(distance 364 or 386) meets a minimum threshold. In some embodiments, for example, the fractional screen height of the text, h/H may be adjusted based on the known height of the display, H. In some embodiments, as illustrated from FIG. 3B to FIG. 3C, as the distance 364 decreases to distances 386 (e.g. the remote control device 302 is moved closer to media processing device 310), the height h of the GUI element (e.g. font or text displayed on display 304-3) may be decreased to account for the proximity of the user to the display 304-3. Similarly, as illustrated by the magnitude of the music notes 370 representing acoustic information, the volume being reproduced by acoustic reproduction devices 304-1 and 304-2 may also be decreased as the user moves closer to the display and the speakers. Other embodiments are described and claimed.

Figure 5:
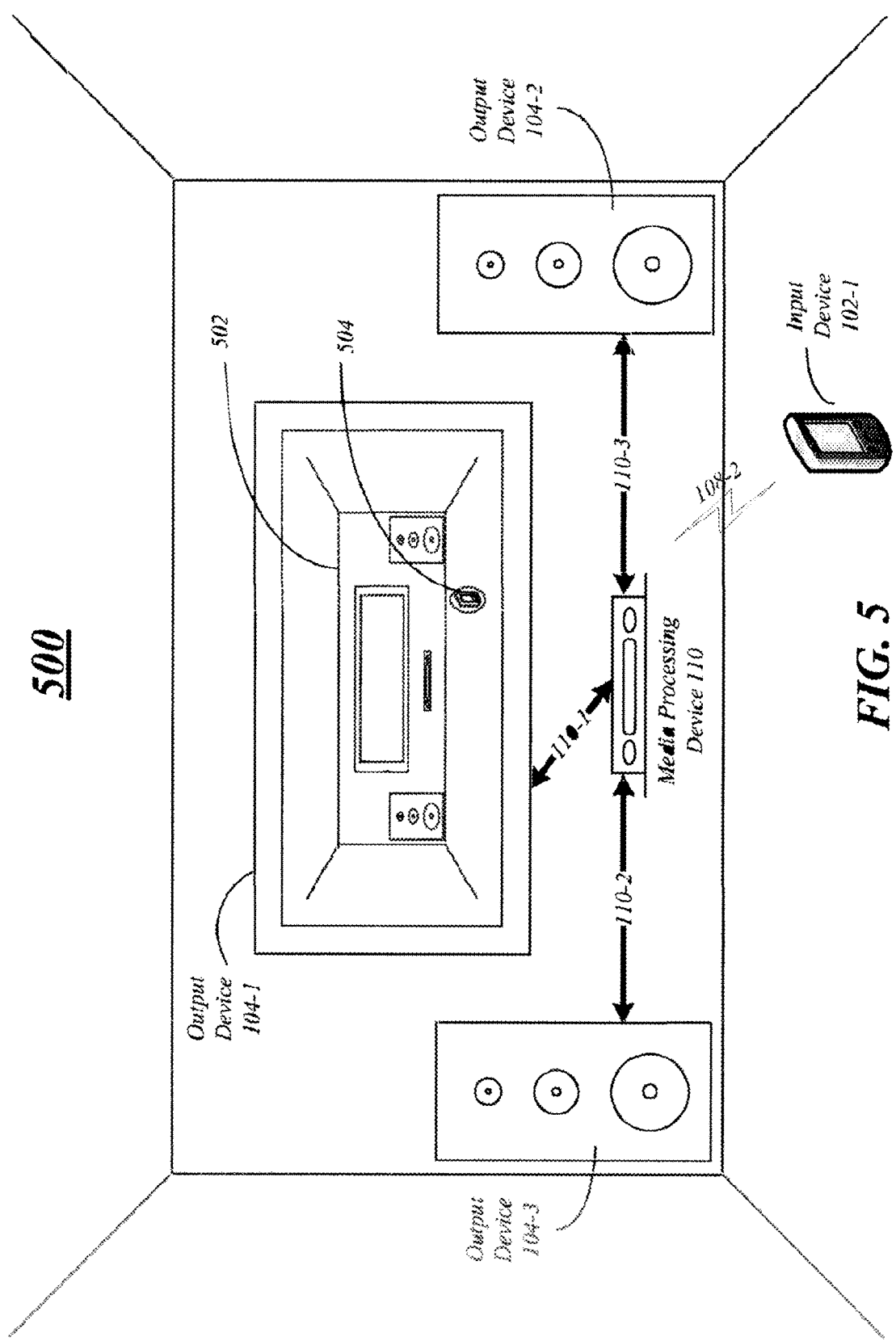
FIG. 5 illustrates one embodiment of a media processing system.
Figure 6:
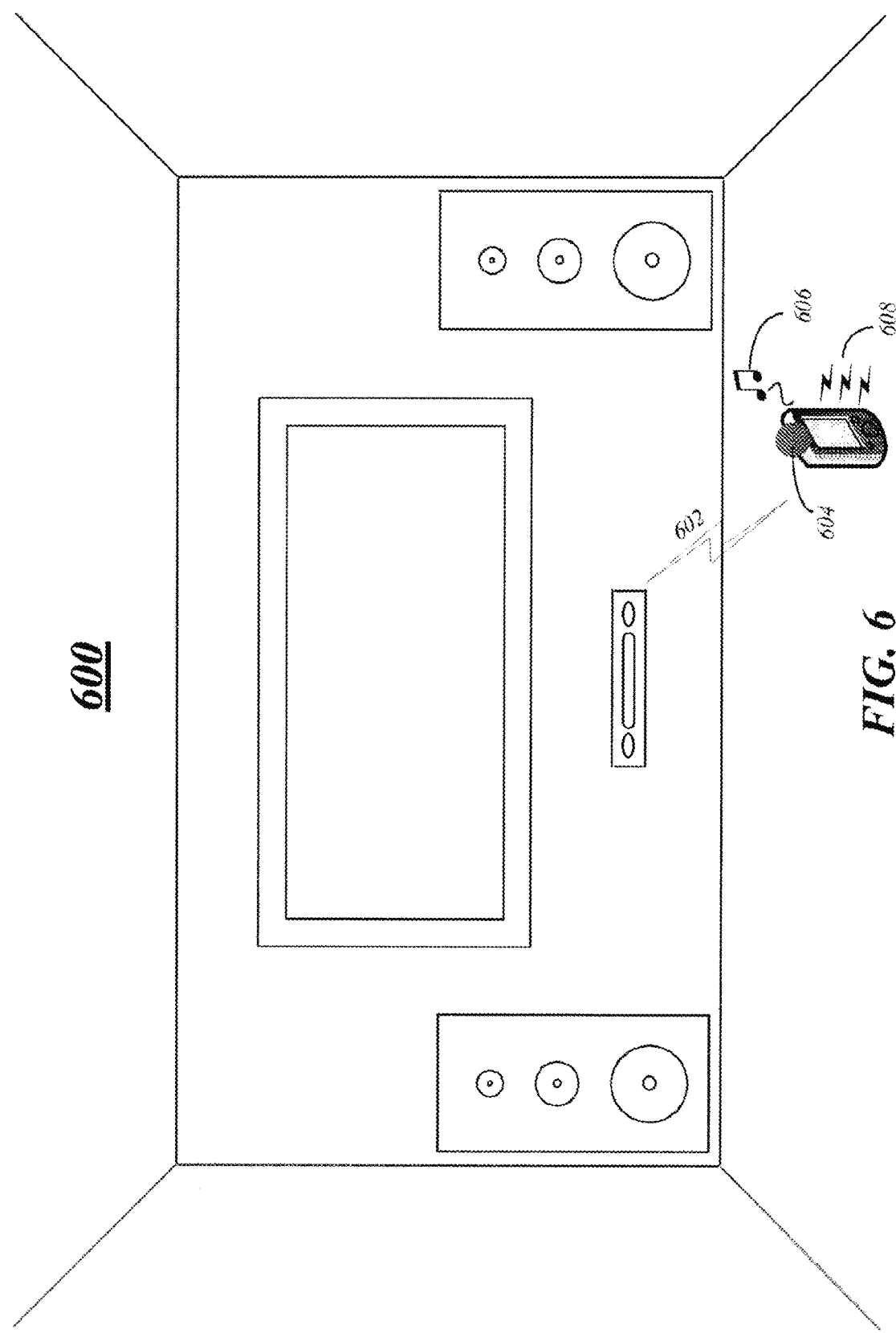
FIG. 6 illustrates one embodiment of a media processing system.

FIG. 5 and FIG. 6 illustrate block diagrams for media processing systems 500 and 600 respectively that may be the same or similar to media processing systems 100 of FIG. 1, 200 of FIG. 2, 300 of FIG. 3A. 350 of FIG. 3B or 380 of FIG. 3C where like elements are similarly numbered. The media processing systems 500 and 600 may comprise sample digital home system implementations that are arranged to provide media content from disparate media sources to viewers in a home, office, or room environment. Although the media processing systems 500 and 600 shown in FIG. 5 and FIG. 6 have a limited number of elements in a certain topology, it may be appreciated that the media processing systems 500 and 600 may include more or less elements in alternate topologies as desired for a given implementation. The embodiments are not limited in this context.

In various embodiments, media processing systems 500 and 600 may be operative or arranged to assist users in locating the remote control device 102-1. For example, in some embodiments as shown in FIG. 5, a media management module of media processing device 110 may be operative to display a graphical user interface (GUI) element 504 representing a location of the remote control device in a GUI view 502 on one or more digital displays. In some embodiments, the GUI view 502 may comprise an augmented reality room representing a physical room containing the system 500 and the remote control device 102-1 on one or more digital displays 104-1. The digital home system 500 may be operative to determine the location of the remote control device 102-1 using the acoustic triangulation techniques described in detail herein and may be operative to display the determined location to the user on the display 104-1. For example, the location of the remote control device 102-1 may be indicated by a flashing icon or beacon 504 within the augmented reality GUI view 502.

As shown in FIG. 6, a media management module of media processing device 110 may be operative to send a reveal request to the remote control device 102-1 in some embodiments, wherein the reveal request is a control directive to instruct the remote control device 102-1 to generate a visual 604, audio 606 or tactile 608 notification to reveal its location to a user. For example, the remote control device may chirp 606 or flash an LED or LCD backlight 604. If equipped with text-to-speech capability, the remote control device can respond with a friendly or whimsical phrase (e.g. "I'm over here!"). In other embodiments, the remote control device may be operative to vibrate 608 to alert the user to its location. Other embodiments are described and claimed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4C:
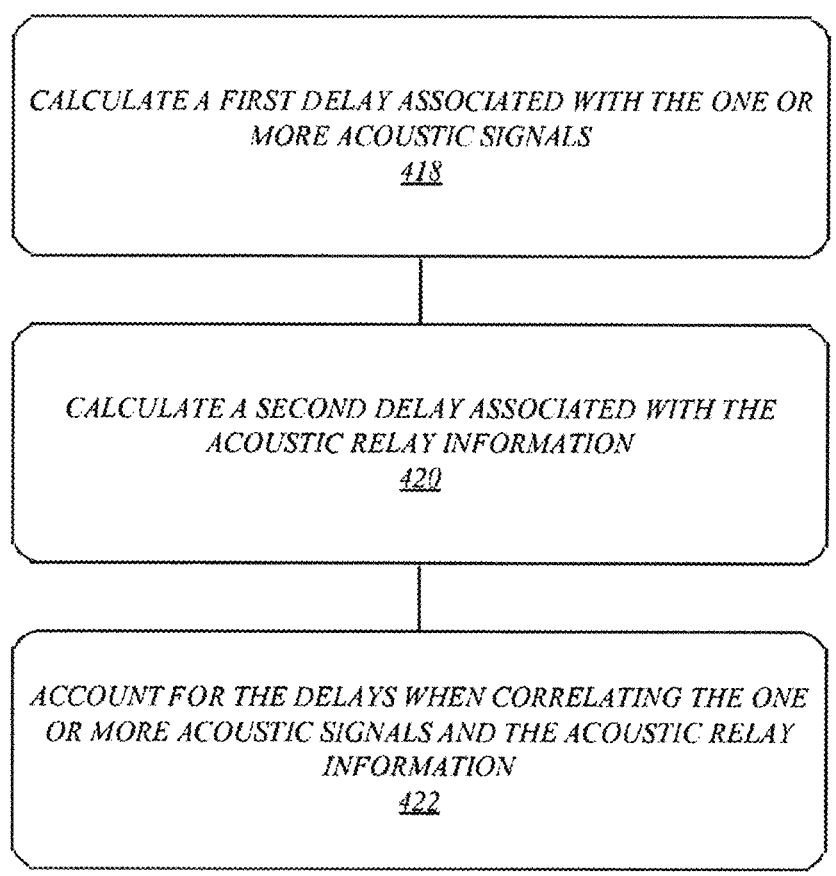
FIG. 4C illustrates one embodiment of a logic flow.

FIGS. 4A, 4B and 4C illustrate embodiments of logic flows 400, 450 and 480 respectively. The logic flows 400, 450 and 480 may be representative of some or all of the operations executed by one or more embodiments described herein.

In the illustrated embodiment shown in FIG. 4A, the logic flow 400 may provide a control directive to an entertainment device operative to provide one or more acoustic signals to two or more spatially distinct acoustic reproduction devices at 402. For example, media management module 314 may be operative to provide a control directive to media processing device 310 that is operative to provide one or more acoustic signals to one or more of acoustic reproduction devices 304-1 and 304-2. At 402, logic flow 400 may receive acoustic relay information from a remote control device operative to receive one or more acoustic sound waves produced from the one or more acoustic signals by the two or more spatially distinct acoustic reproduction devices. For example, transceiver 320 may be operative to receive relay information 309 from remote control device 302 that is operative to receive acoustic sound waves 322-1 and 322-2 from acoustic reproduction device 304-1 and 304-2.

In various embodiments, logic flow 400 may determine a location of the remote control device based on the one or more acoustic signals and the acoustic relay information at 406. For example, media management module 314 may be operative to use known triangulation, multilateration, hyperbolic positioning, trilateration, parallax, resection, geometric, trigonometric, mathematic or any other suitable location determination method to determine a location of remote control device 302. At 408, logic flow 400 may provide a control directive to the entertainment device operative to adjust one or more entertainment parameters based on the determined location. For example, media management module 314 may be operative to provide a control directive to media processing device 310 or display 304-3 to adjust a GUI element 370 displayed on display 304-3, a volume 370 reproduced by acoustic reproduction devices 304-1 and 304-2 or any other suitable entertainment parameter.

The one or more acoustic signals and the acoustic relay information may be correlated at 410 of logic flow 450 of FIG. 4B in some embodiments. For example, media management module 314 may be operative to add, subtract or otherwise mathematically, statistically or logically combine the one or more of acoustic signals 311-2 and 311-3, acoustic sound waves 322-1 and 322-2 and relay information 309. At 412, a transmission time for the one or more acoustic signals from each of the two or more spatially distinct acoustic reproduction devices to the remote control device may be determined. For example, using timing information or other suitable identifiers associated with the acoustic signals 311-2 and 311-3, acoustic sound waves 322-1 and 322-2 and relay information 309, media management module 314 may be operative to determine a time of flight or transmission time for the acoustic sound waves 322-1 and 322-2 from the acoustic reproduction devices 304-1 and 304-2 to the remote control device 302.

In some embodiments, a distance may be determined based on the determined transmission time at 414. For example, media management module 314 may be operative to determine the distance from each of acoustic reproduction devices 304-1 and 304-2 to remote control device 302 based on the transmission time of acoustic sound saves 322-1 and 322-2. A location of the remote control device may be determined or triangulated at 416 based on the determined distances in various embodiments. For example, media management module 314 may be operative to determine a location of the remote control device 302 based, at least in part, on the determined distances 360, 362, 364, 382, 384 and 386. In some embodiments, location information for the two or more spatially distinct acoustic reproduction devices may be received or may be determined based on a known location of the remote control device. For example, media management module 314 may be operative to accept inputs from a user using a configuration utility to account for the position of acoustic reproduction devices 304-1 and 304-2 or the location of the reproduction devices 304-1 and 304-2 may be determined based on a known location of remote control device 302. The embodiments are not limited in this context.

A first delay associated with the one or more acoustic signals may be calculated at 418 of logic flow 480 of FIG. 4C in some embodiments. For example, media management module 314 may be operative to calculate a delay (fixed or variable) associated with providing the acoustic signals 311-2 and 311-3 to acoustic reproduction devices 304-1 and 304-2. At 420, a second delay associated with the acoustic relay information may be calculated. For example, media management module 314 may be operative to calculate a delay associated with remote control device 302 receiving, processing and providing acoustic sound waves 322-1 and 322-2 as relay information 309. In some embodiments, at 422, the delays may be accounted for when correlating the one or more acoustic signals and the acoustic relay information. For example, media management module 314 may be operative to adjust the transmission times, calculated distances or other parameters based on the calculated delays.

In various embodiments, a GUI element for a GUI view presented on a display of the entertainment system or a volume for the entertainment system may be adjusted based on the determined distance. For example, media management module 314 may be operative to generate a GUI view 502 having a GUI element 504 representing a location for the remote control device on one or more digital displays 104-1. In some embodiments, the GUI element and GUI view may comprise a representation of the remote control device in an augmented reality room representing a physical room containing the remote control device.

A reveal request may be sent to the remote control device in some embodiments. In various embodiments, the reveal request comprises a control directive to instruct the remote control device to generate a visual, audio or tactile notification. For example, media management module may be operative to send a control directive 602 to instruct a remote control device to generate a visual 604 notification such a flashing LED light, an acoustic notification 606 such as a beep, chirp or other sound or a tactile notification such as a vibration. Other embodiments are described and claimed.

Figure 7:
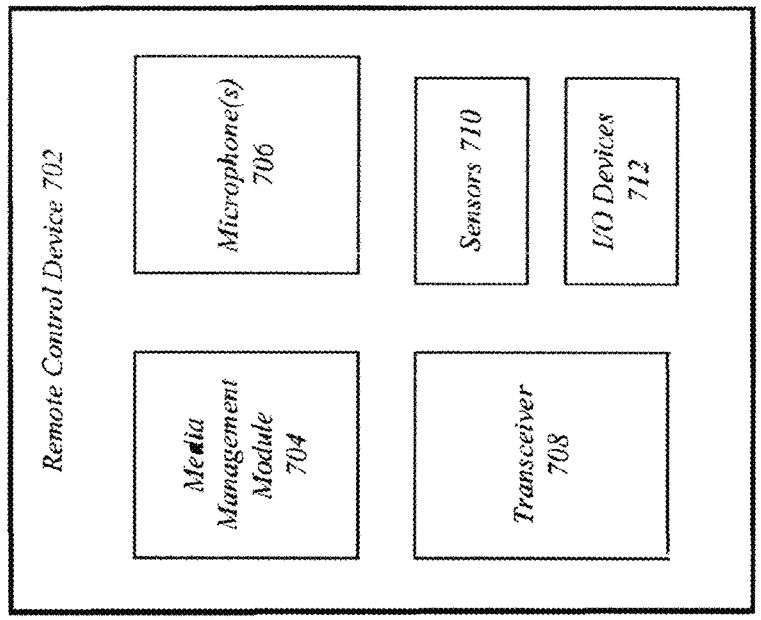
FIG. 7 illustrates one embodiment of a media processing system.
Figure 7:
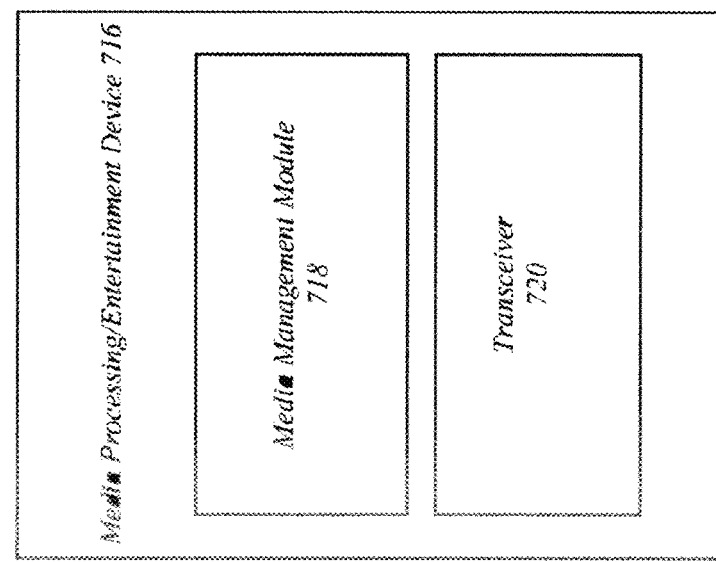

FIG. 7 illustrates a block diagram for a media processing system 700 that may be the same or similar to media processing systems 100 of FIG. 1, 200 of FIG. 2 or 300 of FIG. 3A. The media processing system 700 may comprise a sample digital home system implementation that is arranged to adjust or control one or more entertainment parameters based on received acoustic information in some embodiments. Although the media processing system 700 shown in FIG. 7 has a limited number of elements in a certain topology, it may be appreciated that the media processing system 700 may include more or less elements in alternate topologies as desired for a given implementation. The embodiments are not limited in this context.

In various embodiments, the system 700 of FIG. 7 may by the same or similar to the system 100 of FIG. 1. For example, the media processing/entertainment device 716 of FIG. 7 may correspond to media processing device 110 of FIG. 1, media management module 718 of FIG. 7 may correspond to media management module 114 of FIG. 1 and transceiver 720 of FIG. 7 may correspond to transceiver 120 of FIG. 1. Similarly, remote control device 702 of FIG. 7 may correspond to input device 102-2 of FIG. 1 and may be communicatively coupled to media processing device 716 via connection 714 that may correspond to connection 108-2 of FIG. 1. As shown in FIG. 7, remote control device 702 may comprise or include media management module 704, one or more microphones 706, transceiver 708, sensors 710 and input/output (I/O) devices 712. In some embodiments, media management module 704 of FIG. 7 may correspond to media management module 716 of FIG. 1. The embodiments are not limited to the number, type or arrangement of elements shown in FIG. 7.

In various embodiments, as described herein, media management module 704 and media management module 718 may comprise a same or similar module with similar functionality and while shown as separate elements in FIG. 7, the embodiments are not limited in this respect. In some embodiments the functionality of media management modules 704, 718 may be implemented at remote control device 702, at media processing device 716 or distributed between both remote control device 702 and media processing device 716. For example, to minimize the processing power demands on the remote control device 702, the remote control device 702 may be operative to relay information to the media processing device 716 where the actual speech recognition analysis is performed. In some embodiments, the remote control device 702 may be operative to perform limited pre-processing of acoustic information before providing the information to the media processing device 716. Other embodiments are described and claimed.

An increasing number of electronic devices and systems are offering speech recognition capability as a control interface to the device or system. A common challenge in such systems is reliable recognition of spoken commands in the presence of background noise. Reliable recognition by a remote control device operative to receive the spoken commands in a digital home type system is made particularly difficult by the possible presence of programming dialog, ambient noise or other acoustic interference before, after or concurrent with a user's spoken commands. To provide more reliable speech recognition in a digital home system, a remote control device may be utilized as described herein as the input mechanism for spoken commands in various embodiments.

FIGS. 8A, 8B, 8C and 8D illustrate example embodiments of a plurality of remote control devices 800, 820, 840 and 860 respectively. In some embodiments, the remote control devices 800, 820, 840 and 860 may be the same or similar to remote control device 702 of FIG. 7 and, while not shown, may implement the same or similar elements. Other embodiments are described and claimed.

Figure 8A:
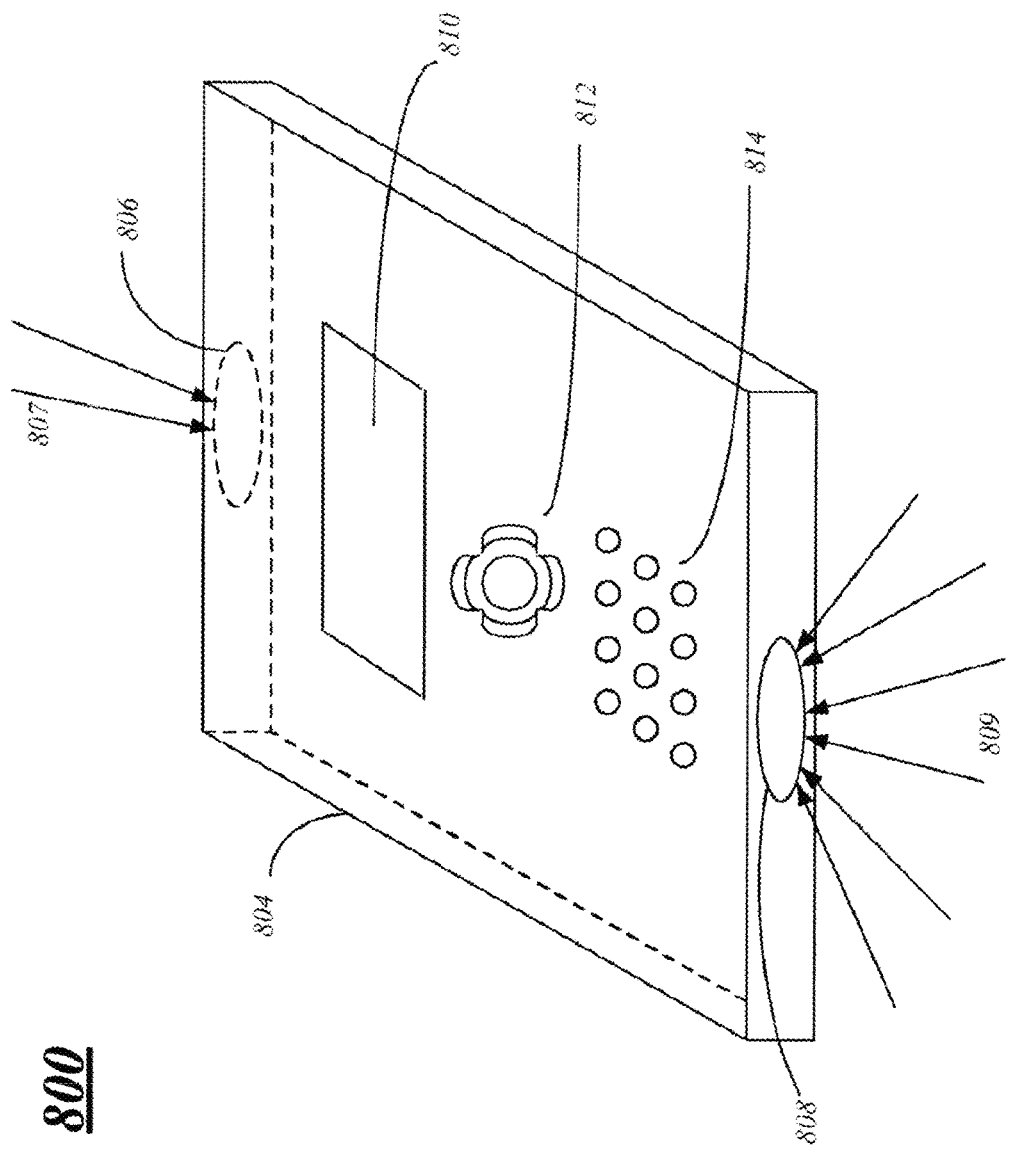
FIG. 8A illustrates one embodiment of a media processing system.

As shown in FIG. 8A, remote control device 800 includes an enclosure 804, first microphone 806, second microphone 808, touch screen or touch pad interface 810, navigational controls 812 and inputs 814. The embodiments are not limited to the number, type or arrangement of elements shown in FIG. 8A. In some embodiments, microphones 806 and 808 may comprise one or more condenser microphones, electret condenser microphones, dynamic microphones, ribbon microphones, carbon microphone, piezoelectric microphones, fiber optic microphone, laser microphones, liquid microphones or MEMS microphones. While described herein as comprising directional and omnidirectional microphones, it should be understood that any suitable microphone could be used and still fall within the described embodiments. For example, the microphones 806, 808 may comprise omnidirectional, directional, unidirectional, cardioid, bi-directional, shotgun, boundary or "PZM" microphones. In other embodiments, the remote control device 800 may include a plurality of different microphones at each end of the device. For example, each end of the remote control device may include both a directional and an omnidirectional microphone in some embodiments. The embodiments are not limited in this respect.

In various embodiments, the first microphone 806 may comprise a directional microphone and the second microphone 808 may comprise an omnidirectional microphone. In some embodiments, a microphone's directionality or polar pattern indicates how sensitive it is to sounds arriving at different angles about its central axis. An omnidirectional or non-directional microphone may be generally considered to have or comprise a response or polar pattern 809 comprising a sphere in three dimensions that allows for the capture of acoustic information from a plurality of directions. In some embodiments, a directional or unidirectional microphone is sensitive to sounds from only one direction or substantially only one direction as illustrated at 807.

In various embodiments, the microphones are positioned 806, 808 within the remote control device 800 such that the axis of maximum sensitivity is directed towards the user when the remote control device 800 is held in a standard speaking orientation and position (e.g. upright in the hand with the transmitting end of the remote near the user's mouth—as the user would hold a conventional microphone). For example, the remote control device 800 contains one microphone 806 at the upper end and a second microphone 808 at the opposing (lower) end.

Remote control device 820 of FIG. 8B, in addition to the components of remote control device 800, may additional or alternatively include a plurality of input buttons, scroll wheels or other input devices 814 and a touch sensitive track pad surface 810. Remote control device 840 of FIG. 8C additionally includes a speaker 820. Remote control device 860 of FIG. 8D may comprise or be implemented by a mobile computing device. For example, remote control device 860 may comprise a software emulated remote control device implemented, for example, by an Apple® iPhone®, a mobile computing device running the Google® Android® operating system or other similar computing device. In various embodiments, each of the remote control devices 800, 820, 840 and 860 may optionally include a capacitive touch sensor that allows scrolling and clicking for pointing and selecting in two dimensions 810, accelerometers and other sensors that detect movement and provide pointing capability that supplements (or replaces) that of the touch pad, ergonomically laid out buttons that are intuitive to use, a keyboard that may be remapped from a full QWERTY layout in a horizontal orientation to a more traditional remote control layout in a vertical orientation, a thumb wheel that allows quick and intuitive scrolling through a list of options, a speaker to provide a variety of audible prompts, and an LCD display to provide channel information and other data that is better to be shown to the user on the remote control device than on the main television screen or display. Other embodiments are described and claimed.

Returning to FIG. 7, remote control device 702 may include a media management module coupled to the plurality of microphones in some embodiments. In various embodiments, the media management module may be operative to receive acoustic information from one or more of the plurality of microphones and to generate an acoustic management signal. For example, the media management module may be operative to receive a first acoustic input from a first microphone arranged on a first side of the enclosure and a second acoustic input from a second microphone arranged on a second side of the enclosure substantially opposite the first side as shown in FIG. 8A. The first acoustic input may comprise a voice command signal and the second acoustic input may comprise an ambient noise signal in some embodiments. In some embodiments, the voice command signal may comprise a spoken command from a user. The ambient noise signal may comprise any noise detected by the omnidirectional microphone including but not limited to programming audio, human voices, and other background noise.

In various embodiments, the voice command signal may comprise any voice command having an associated action. For example, the voice command may correspond to any action that can be performed by the remote control device using other input mechanisms including, but not limited to, turning on or off components of an entertainment system, selecting components of an entertainment system, managing media, or changing any number of entertainment parameters such as changing the volume of an acoustic output, changing a channel, fast forwarding media or any other suitable parameter. One skilled in the art will understand that any number and type of parameter or control directive associated with an entertainment system may be mapped to a voice command.

In various embodiments, remote control device 702 may include a wireless transceiver 708 communicatively coupled to the media management module 704. In some embodiments, the wireless transceiver 708 may be operative to transmit the acoustic management signal to an entertainment device 716 that is operative to adjust one or more entertainment parameters of an entertainment system based on the acoustic management signal.

In various embodiments, to minimize the processing power demands on the remote control device 702, the remote control device 702 may be operative to relay information to the media processing device 716 where speech recognition analysis is performed. For example, the transceiver 708 may be operative to transmit both the voice command signal 807 and the ambient noise signal 809 to the media processing device 716. In some embodiments, media processing device 716 may comprise media management module 718 that is operative to subtract the ambient noise signal from the voice command signal to generate an isolated voice command signal and to subtract a known programming signal from the isolated voice command signal to identify an action associated with the voice command signal. For example, media management module 718 of media processing device 716 may be operative to monitor one or more acoustic outputs of the system 700 and store or buffer the outputs to generate the known programming signal.

In some embodiments, the remote control device 702 may be operative to perform pre-processing of acoustic information before providing the information to the media processing device 716. For example, in some embodiments the media management module 704 may be operative to subtract the ambient noise signal 809 from the voice command signal 807 to generate an isolated voice command signal. After performing this simple cancellation, transceiver 708 may be operative to transmit the isolated voice command signal to the entertainment device 716 that includes media management module 718 that is operative to subtract the known programming signal from the isolated voice command signal to identify an action associated with the voice command signal. Other embodiments are described and claimed.

In various embodiments, any known method for combining or cancelling noise from acoustic signals may be used to implement the above-described embodiments. For example, a simple inverted-phase summation of the two microphone 806, 808 signals 807, 809 may be used to effectively cancel much of the ambient noise that arrives with equal intensity at both microphones 806, 808 in some embodiments. One skilled in the art will understand that the mathematical or logical combination or cancellation of the noise signals to isolate the voice command signal could be performed in any number of ways and still fall within the described embodiments.

To avoid spurious detection of verbal commands in ambient speech, the remote control device 702 or media processing device 716 may be operative to gate the speech recognition processing. In some embodiments, for example, a user may be required to press a "push to talk" button to initiate speech recognition. As recited above, remote control device 702 may include one or more input devices 712 communicatively coupled to the media management module 704 in various embodiments. For example, the one or more input devices 712 may comprise one or more of a touch sensitive surface, scroll wheel or one or more buttons, switches, levers or toggles. In various embodiments, the media management module 704 may be operative to receive the acoustic information or initiate speech recognition processing based on a signal generated in response to an activated input device. For example, a button press or multi-touch gesture may be used to initiate speech recognition processing. Other embodiments are described and claimed.

In various embodiments, speech recognition may be automatically initiated or activated if the remote control device 702 is moved or placed in a certain position. Remote control device 702 may include one or more sensors 710 communicatively coupled to the media management module 704 in some embodiments. For example, sensors 710 may comprise one or more of an accelerometer, proximity sensor, tilt sensor, optical sensor, pressure sensor, thermal sensor, camera or any other suitable sensor. In various embodiments, media management module 704 may be operative to automatically receive the acoustic information or initiate speech recognition processing based on information received from one or more of the sensors. For example, remote control device 702 may be operative to detect (e.g. via accelerometer measurements, for example) that a user has raised the remote control device 702 to a standard speaking orientation and position and this action may be interpreted as a request to initiate speech recognition processing. In other embodiments, remote control device 702 may be operative to determine a proximity of the remote control device to the user's face (e.g. using a camera or proximity sensor, for example) and may initiate speech recognition processing based on a predetermined proximity threshold.

Figure 9B:
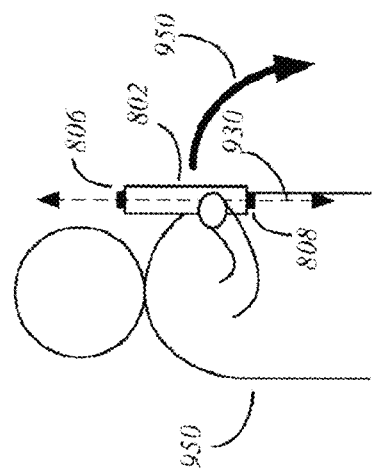
FIG. 9B illustrates one embodiment of usage scenario.
Figure 9A:
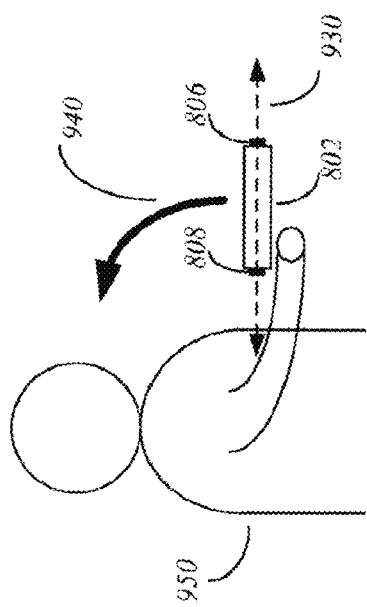
FIG. 9A illustrates one embodiment of usage scenario.

FIG. 9A and FIG. 9B illustrate an example usage scenario in which orientation of the remote control device 802 is used to initiate speech recognition processing. As shown in FIG. 9A, a user 950 is holding a remote control device 802 having a first microphone 806 and a second microphone 808 in a standard operating position. In this position, an axis of sensitivity 930 for the two microphones is not directed toward the user's mouth and speech recognition processing is disabled, allowing normal operation of the remote control device 802. In various embodiments, however, the user 950 may choose to move the remote control device 802 in a direction indicated by arrow 940 that may result in the configuration shown in FIG. 9B. In the arrangement of FIG. 9B, the axis of sensitivity 930 is now on plane with or substantially directed toward the user's mouth and the directional microphone 806 is located near the user's mouth. Movement into this position or configuration, as detected by one or more sensors, may be used to initiate speech recognition processing. For example, in some embodiments a media management module of the remote control device 802 may be operative to automatically receive the acoustic information or initiate speech recognition processing based on a sensed direction of an axis of sensitivity 930 for the plurality of microphones 806, 808 or based on an arrangement, position or location of the apparatus. When the user no longer desires to utilize speech recognition processing, the user may return the remote control device 802 to the original position as indicated by arrow 950 and speech recognition processing may be disabled. Other embodiments are described and claimed.

In various embodiments, the described elements of remote control device 702 may be additionally or alternatively used for purposes other than speech recognition processing. For example, variations in volume levels within television programming or other acoustic media can prove frustrating to a user. In particular, the volume of programming content that may be of less interest to a user, such as commercials, often exceeds (perhaps by design) that of the primary programming. Many users find the volume levels during commercials agonizingly loud. In various embodiments, to mitigate the effects of changes in volume level within television and other acoustic programming, remote control device 702 may be operative to utilize the one or more microphones 706 to collectively provide directional sensing of volume levels and, if the volume levels of the programming content exceed a predefined threshold, the remote control device 702 may be operative to automatically duck or reduce the television volume and when the volume levels return to an acceptable level, the initial volume may be restored.

In contrast to approaches that equalize volume levels at a television directly, the directional microphones 706 of the remote control device 702 may allow the remote control device 702 to adjust volume levels in light of the level of ambient noise in some embodiments. For example, in one variation of the volume ducking system, the determination of excessive volume may be based on a difference between the television volume and the ambient noise level.

In some embodiments, media management module 704 may be coupled to the plurality of microphones 706 and may be operative to receive acoustic information from one or more of the plurality of microphones 706. In various embodiments, the acoustic information may comprise a content acoustic signal and the media management module 704 may be operative to compare the content acoustic signal to a volume threshold that may be established, for example, based on a previously selected volume level. The media management module 704 may be operative to automatically send a volume increase request to the entertainment device 716 if the content acoustic signal is less than the threshold or automatically send a volume decrease request to the entertainment device 716 if the content acoustic signal is greater than the threshold.

In various embodiments, the acoustic information received by media management module 702 may comprise a comparison of a content acoustic signal and an ambient noise signal. In these embodiments, media management module 704 may be operative to send a volume change request to the entertainment device 716 based on the comparison. For example, media management module 704 may be operative to automatically send a volume increase request if the content acoustic signal has a lower magnitude than the ambient noise signal or automatically send a volume decrease request to the entertainment device 716 if the content acoustic signal has a greater magnitude than the ambient noise signal.

While not shown, in some embodiments the remote control device 1202 may be operative to perform phone functionality in association with media processing device 1216. For example, the lower microphone 808 within the noise-cancelling pair of microphones 806, 808 described above can be used to provide phone headset functionality via the remote control device 800. In some embodiments media management module 1214 may be operative to manage a communication connection with one or more communication devices (not shown) and with remote control device 1202 using one or more wireless transceivers 1220. For example, the communication connection may comprise a voice call, text message or other suitable communication connection and a user may be able to interact with the communication connection via the remote control device.

In various embodiments, the communication connections may be established using different transceivers 1220 and/or different communication technologies. For example, the communication connection between the media management module 1216 and the one or more communication devices may comprise a WiFi connection and the connection between the media management module 1216 and the remote control device may comprise a Bluetooth connection. The embodiments are not limited in this respect and one skilled in the art will understand that any suitable connection technology could be used for either or both connections and still fall within the described embodiments. In some embodiments, the first and second communication connections are established using a single wireless transceiver and in other embodiments the first and second communication connections are established using different wireless transceivers.

In some embodiments, one or more wireless transceivers 1220 may be operative to send and receive communication information for the communication connection to and from a remote control device 1202 operative to control or is otherwise associated with one or more entertainment devices. For example, media management module 1218 may be operative to receive call information from one or more communication devices over a first communication connection and relay this information to the remote control device 1202 over a second communication connection. The media management module may be further operative to receive response information from the remote control device over the second communication connection that is in turn relayed to the media management module 1218. The call information may comprise, the voice of a caller, for example. In various embodiments, the media processing device 1216 may be operative to relay the information received from the remote control device 1202 to the one or more communication devices over the first communication connection. In some embodiments, the information received from the remote control device may comprise the voice of the user, for example. The embodiments are not limited in this respect.

In some embodiments, the media management module 1218 may be operative to initiate the communication connection based on a request received from the remote control device 1202. For example, a user can participate in telephone calls via the digital home system by dialing a phone number on a numeric pad 1212 of the remote control device 1202 and holding the remote control device to his or her ear as he or she would a conventional telephone. In some embodiments, the request to initiate the communication connection may comprise a voice command signal received from one or more microphones 1206 of the remote control device 1202 or an input command signal received from one or more input devices 1212 of the remote control device 1202. For example, a user may speak the command "Call Mom." Using the speech recognition processing described herein, the digital home system may be operative to identify the command and send appropriate control directives to act on the command. In the above-described example, the media processing device 716 may be operative to identify the command, locate an identifier (e.g. telephone number) associated with the command, and place the telephone call in response to the spoken command. In other embodiments, telephone calls may be initiated using any form of inputs or sensors available on the remote control device, such as one or more input or numeric keys.

In various embodiments, the media management module 1218 may be operative to initiate the communication connection based on request received from one or more of the communication devices and based on a response to the request received from the remote control device 1202. For example, an incoming call may be received from a communication device and various actions may be taken based on the incoming call. The media management module 1218 may be operative to send a control directive to one or more of the entertainment devices to reproduce identification information for the communication connection in some embodiments. For example, a name and/or number related to the caller may be displayed on a display of the entertainment system or on a display of the remote control device 1202 or an announcement of the call my be generated using the acoustic reproduction devices of the system. In various embodiments, a user may be provided with the options typically associated with an incoming call via the one or more displays, such as accept, reject, send to voicemail or any other suitable option. These options may be selected via the remote control device in some embodiments.

Receiving or placing a call may result in changes to other media or media sources in some embodiments. For example, the media management module 1218 may be operative to send a control directive to one or more of the entertainment devices to adjust media information based on the communication connection. For example, in various embodiments the media processing device 1216 may be operative to automatically reduce or mute a volume of a currently active media source to allow for the receipt of the telephone call. In some embodiments, media processing device 1216 may be operative to alter a programming stream such as pausing or stopping a currently active media source or stream based on an incoming call. Similar operations may also be employed for outgoing calls initiated using the remote control device.

In some embodiments, telephone calls related to current programming content can be dialed using a function button on the remote control device or selection of an on-screen icon, allowing the user to more easily engage in activities such as television-based shopping. For example, the media management module 1218 may be operative to automatically initiate a communication connection corresponding to media information based on a request received from the remote control device. Other embodiments are described and claimed.

In various embodiments, the communication connection may comprise a telephone call comprising voice over internet protocol (VoIP) call and the media processing device 1216 may act as the intermediary for the call. For example, the media processing device 1216 may be communicatively coupled to an external network such as the Internet or a PSTN network (not shown) to provide the telephone calling functionality. In some embodiments, an incoming or outgoing telephone call may be handled by the digital home system as another form of media from one or more of media sources 106-c. In some embodiments, the received audio signal related to the telephone call may be relayed to the user using the output devices 104-2 and 104-3 of the digital home system or in some embodiments a separate speaker 820 may be included on the remote control device 840 as shown in FIG. 8C. The remote control device may also be used in some embodiments to enable other forms of communication such as text (SMS) messaging, chatting or social networking via the media processing device. The embodiments are not limited in this respect and other embodiments are described and claimed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIGS. 10A, 10B, 10C and 11 illustrate embodiments of logic flows 1000, 1050, 1080 and 1100 respectively. The logic flows 1000, 1050, 1080 and 1100 may be representative of some or all of the operations executed by one or more embodiments described herein.

Figure 10A:
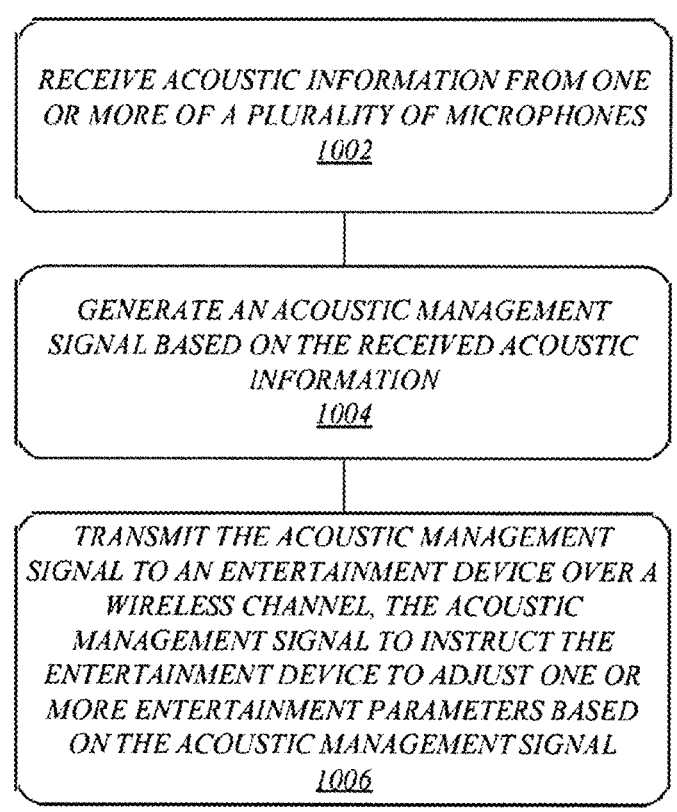
FIG. 10A illustrates one embodiment of a logic flow.

In the illustrated embodiment shown in FIG. 10A, the logic flow 1000 may receive acoustic information from one or more of a plurality of microphones at 1002. For example, media management module 704 may be operative to receive acoustic information from microphones 706. At 1004, logic flow 1000 may generate an acoustic management signal based on the received acoustic information. For example, media management module 704 may be operative to generate an acoustic management signal based on the information received from microphones 706. In some embodiments, the acoustic management signal may be based on a first acoustic input received from a first microphone arranged on a first side of an enclosure and a second acoustic input received from a second microphone arranged on a second side of the enclosure substantially opposite the first side. In various embodiments, the first acoustic input may comprise a voice command signal and the second acoustic input may comprise an ambient noise signal and the first microphone may comprise a directional microphone and the second microphone may comprise an omnidirectional microphone. For example, the microphones may comprise microphones 806 and 808 of remote control device 800 that is operative to receive a voice command signal 807 and an ambient noise signal 809.

In some embodiments, at 1006, logic flow 1000 may transmit the acoustic management signal to an entertainment device over a wireless channel. For example, media management module 704 may be communicatively coupled to transceiver 708 that is operative to transmit the acoustic management signal to transceiver 720 of media processing device 716 via connection 714. In various embodiments, the acoustic management signal is to instruct the entertainment device to adjust one or more entertainment parameters of an entertainment system based on the acoustic management signal.

Figure 10B:
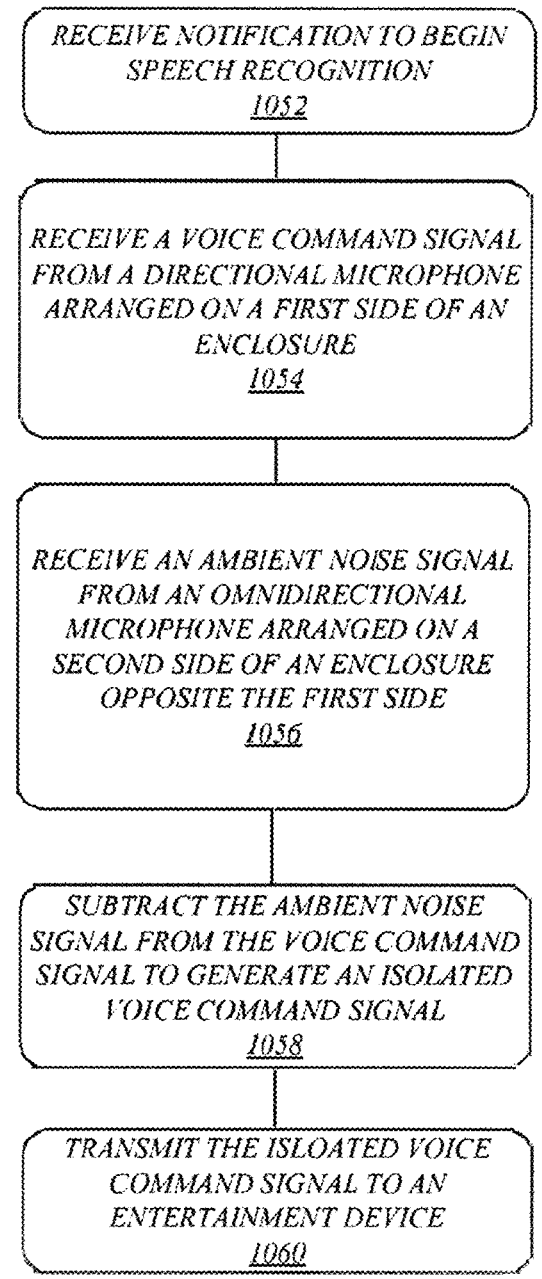
FIG. 10B illustrates one embodiment of a logic flow.

In the illustrated embodiment shown in FIG. 10B, the logic flow 1050 may receive notification to begin speech recognition processing at 1052. For example, remote control device 702 may automatically initiate speech recognition processing based on information from sensors 710 or information from I/O devices 712. In various embodiments, status information may be received from the one or more sensors coupled to the media management module and the acoustic information may be automatically received based on the status information. In some embodiments, for example, the status information may be received based on a direction of an axis of sensitivity for the plurality of microphones as illustrated in FIGS. 9A and 9B. In various embodiments, the acoustic information may be received or speech recognition processing may be initiated based on a signal generated in response to an activation signal received from one or more input devices. For example, activation of one or more of I/O devices 712 may be operative to initiate speech recognition processing of remote control device 702.

In various embodiments, a voice command signal may be received from a directional microphone arranged on a first side of an enclosure at 1054. For example, microphone 806 may be operative to receive voice command signal 807 in some embodiments. At 1056, an ambient noise signal may be received from an omnidirectional microphone arranged on a second side of an enclosure opposite the first side. For example, microphone 808 may be operative to receive ambient noise signal 809 in various embodiments.

At 1058, in some embodiments, the ambient noise signal may be subtracted from the voice signal to generate an isolated voice command signal and at 1060 the isolated voice command signal may be transmitted to the entertainment device. For example, media management module 704 may be operative to subtract the ambient noise signal 809 from the voice command signal 807 and the transceiver 708 may be operative to transmit the resulting isolated voice command signal to media processing device 7016 in some embodiments. In various embodiments, the media processing device 716 is then operative to subtract a known programming signal from the isolated voice command signal to identify an action associated with the voice command signal.

Figure 10C:
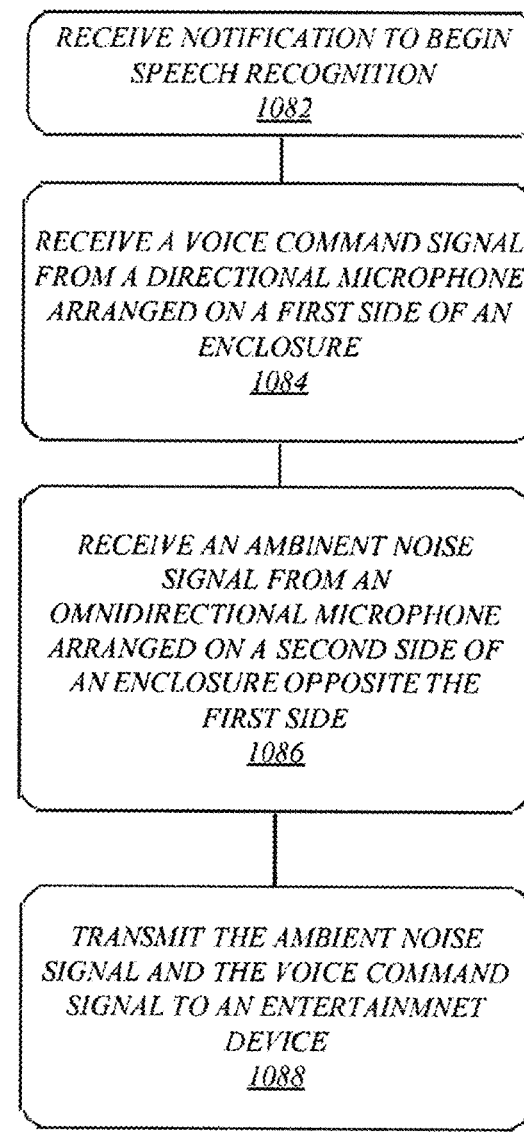
FIG. 10C illustrates one embodiment of a logic flow.

In the illustrated embodiment shown in FIG. 10C, the logic flow 1080 may receive notification to being speech recognition at 1082, receive a voice command signal from a directional microphone arranged on a first side of an enclosure at 1084 and receive an ambient noise signal from an omnidirectional microphone arranged on a second side of an enclosure opposite the first side at 1086 as described above with reference to FIG. 10B. At 1088, in some embodiments, the voice command signal and the ambient noise signal may be transmitted to the entertainment device. For example, media management module 704 may be operative to transmit both the voice command signal 807 and the ambient noise signal 809 to media processing device 716. In various embodiments, media management module 718 of media processing device 716 may be operative to subtract the ambient noise signal from the voice command signal to generate an isolated voice command signal and to subtract a known programming signal from the isolated voice command signal to identify an action associated with the voice command signal. Other embodiments are described and claimed.

Figure 11:
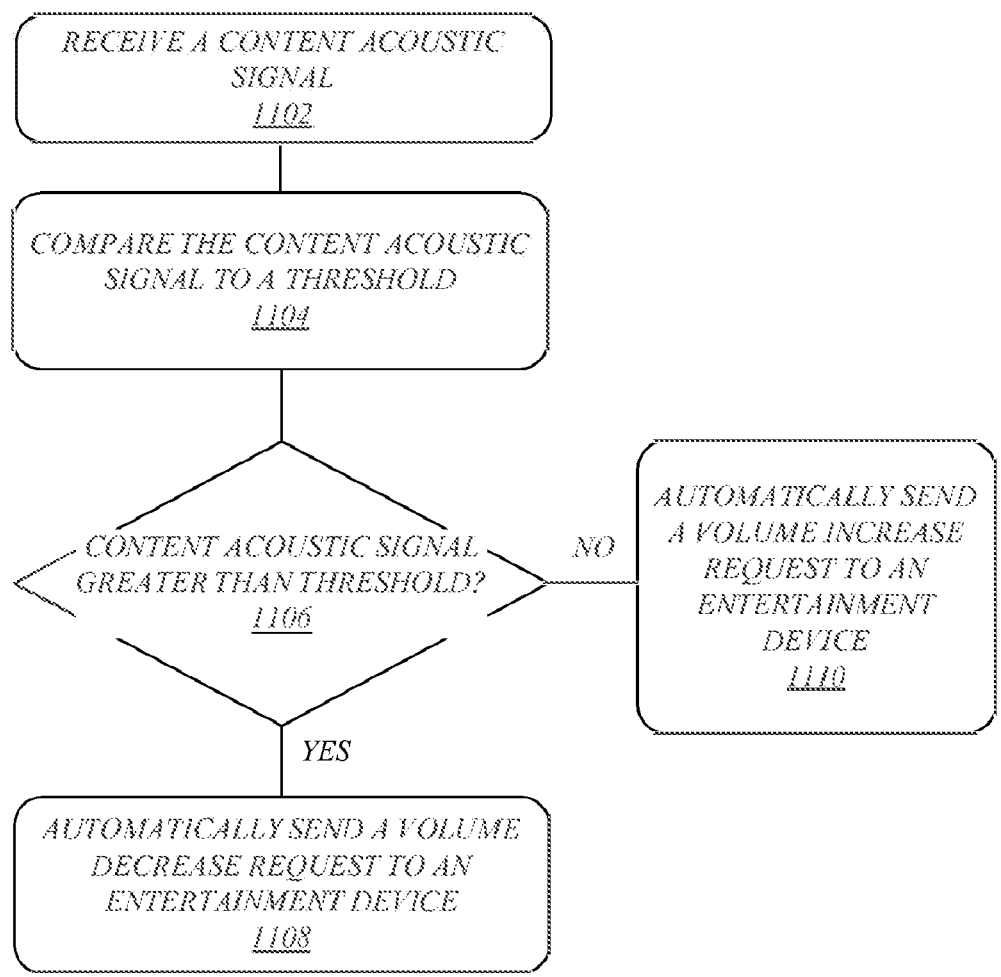
FIG. 11 illustrates one embodiment of a logic flow.

In the illustrated embodiment shown in FIG. 11, the logic flow 1100 may receive a content acoustic signal at 1102. For example, one or more of microphones 706 may be operative to receive acoustic signals or sound waves generated by an entertainment device or an acoustic reproduction device. At 1104, in some embodiments, the content acoustic signal may be compared to a volume threshold. For example, media management module 704 may be operative to compare the content acoustic signal to a volume threshold established based on a previously selected volume level.

At 1106, if the content acoustic signal is greater than the threshold, a volume decrease request may be automatically sent to the entertainment device. For example, remote control device 702 may be operative to send a volume decrease request to media processing device 716 if the volume of the content acoustic signal exceeds the volume threshold. In some embodiments, at 1106, a volume increase request may be automatically sent to the entertainment device if the content acoustic signal is less than the threshold. For example, remote control device 702 may be operative to send a volume decrease request to media processing device 716 if the volume of the content acoustic signal is below the established the volume threshold.

In various embodiments, a content acoustic signal and an ambient noise signal in the acoustic information may be compared and a volume change request may be sent to the entertainment device based on the comparison. For example, media management module 704 may be operative to compare the content acoustic signal and the ambient noise signal and automatically send a volume increase request if the content acoustic signal has a lower magnitude than the ambient noise signal automatically send a volume decrease request to the entertainment device 716 if the content acoustic signal has a greater magnitude than the ambient noise signal. Other embodiments are described and claimed.

Figure 12:
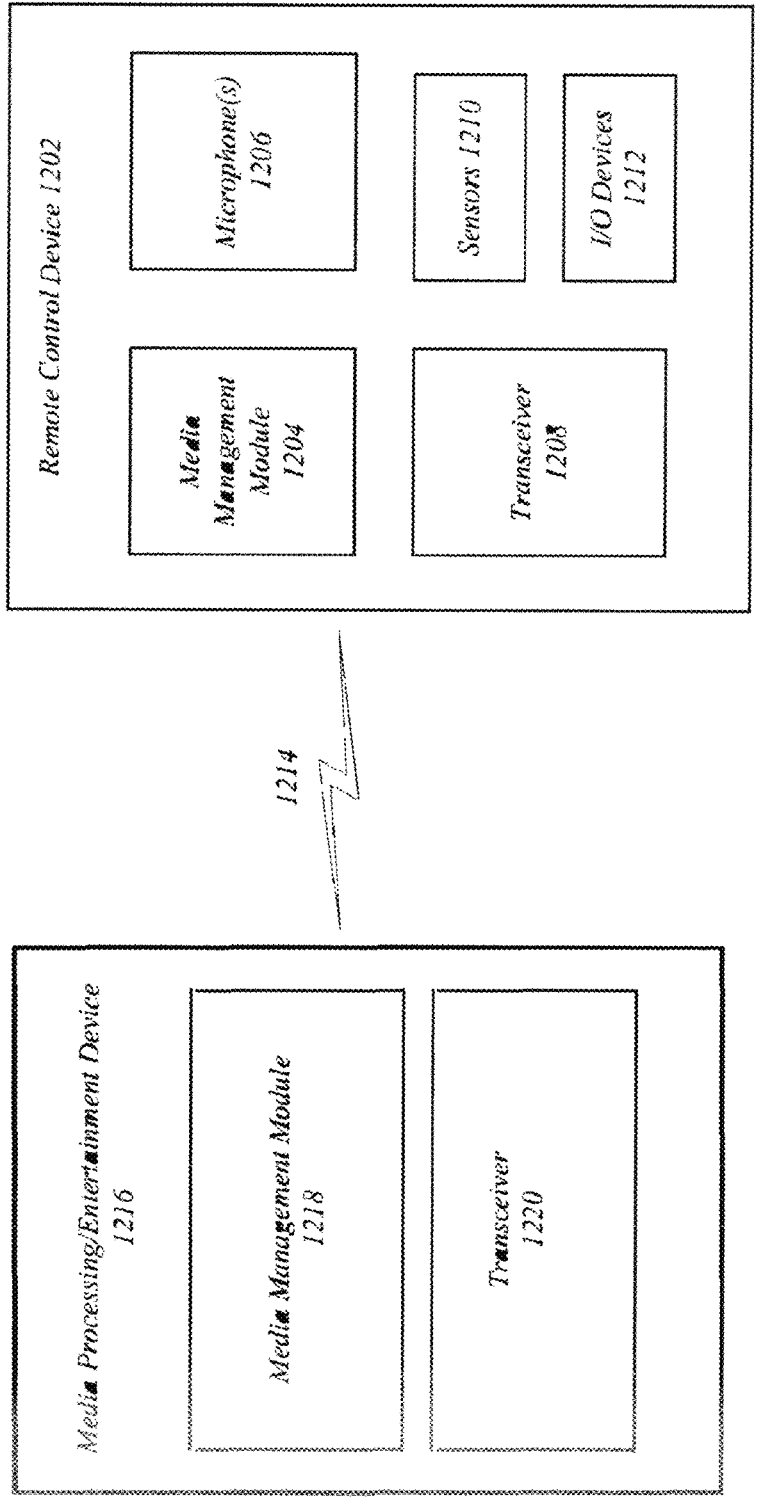
FIG. 12 illustrates one embodiment of a media processing system.

FIG. 12 illustrates a block diagram for a media processing system 1200 that may be the same or similar to media processing systems 700 of FIG. 7. The media processing system 1200 may comprise a sample digital home system implementation that is arranged to adjust or control one or more entertainment parameters based on received acoustic information in some embodiments. Although the media processing system 1200 shown in FIG. 12 has a limited number of elements in a certain topology, it may be appreciated that the media processing system 1200 may include more or less elements in alternate topologies as desired for a given implementation. The embodiments are not limited in this context.

In various embodiments, media processing system 1200 may comprise a system in which media management processing is offloaded from remote control device 1202 to media processing device 1216. In various embodiments, offloading the media management processing may be advantageous to, for example, conserve battery power for the remote control device 1202.

In some embodiments, media processing device 1216 may include a media management module 1218 operative to receive an indication that a remote control device is initiating voice control. For example, the media management module 1218 may be operative to receive an indication that the remote control device 1202 is arranged in a predetermined configuration to initiate voice control or one or more I/O devices 1212 or sensors 1210 of the remote control device 1202 have been activated to initiate voice control.

Wireless transceiver 1220 may be operative to receive acoustic information from the remote control device in some embodiments. For example, the acoustic information may comprise a measured audio signal received from the remote control device 1202 comprising a correlation of a first acoustic input received by a first microphone arranged on a first side of the remote control device 1202 and a second acoustic input received by a second microphone arranged on a second side of the remote control device opposite the first side. The correlation of the first and second acoustic inputs may comprise a difference between the first and second acoustic inputs as determined by the media management module 1204 of remote control device 1202 in some embodiments. In these embodiments, media management module 1218 may be operative to subtract the programming audio signal from the difference. In other embodiments, the correlation of the first and second acoustic inputs may comprise a combination of the first and second acoustic inputs and the media management module may be operative to subtract the second acoustic input from the first acoustic input and to subtract the programming audio signal from the difference. The embodiments are not limited in this context.

In various embodiments, the media management module 1218 may be operative to subtract a programming audio signal comprising a known acoustic signal from the received acoustic information to identify a voice command signal in the acoustic information. For example, media management module 1218 may be operative to perform speech recognition processing to identify a spoken command in the acoustic information received from remote control device 1202. Media management module 1218 may be operative to identify an action associated with the voice command signal and send a control directive to the entertainment system to control one or more components of the entertainment system based on the action in some embodiments. For example, in some embodiments the control directive may comprise an instruction or other signal operative to cause the entertainment system to act or respond to the voice command.

Figure 13:
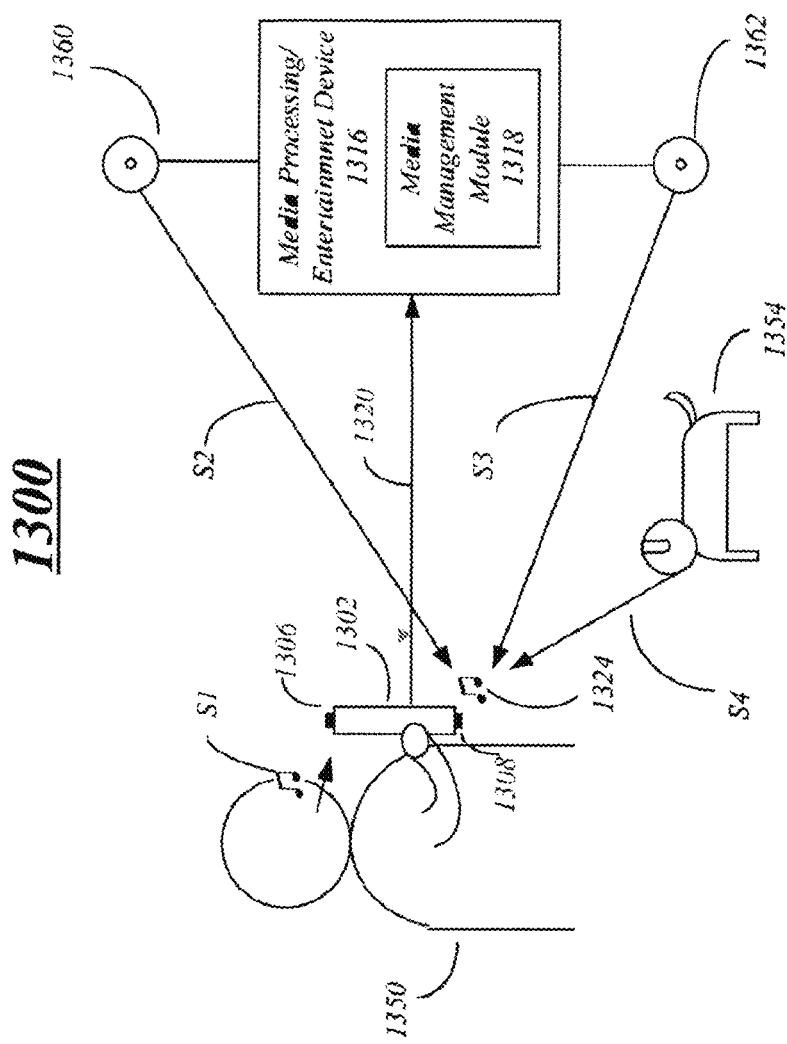
FIG. 13 illustrates one embodiment of a media processing system.

FIG. 13 illustrates an example system diagram 1300. The system 1300 may comprise an example digital home system implementation as described herein. In some embodiments, the system 1300 may include but is not limited to media processing device 1316, acoustic reproduction devices 1360 and 1362 and remote control device 1302. In some embodiments, remote control device 1302 may include microphones 1306 and 1308. The system 1300 is not limited to the number, type or arrangement of elements depicted in FIG. 13.

In various embodiments, the user 1350 may initiate speech recognition processing by orienting the remote control device 1302 as indicated in FIG. 13 (and as discussed with respect to FIGS. 9A and 9B). As recited above, other methods to initiate speech recognition processing are available, but are not described with reference to FIG. 13 for purposes of clarity. In some embodiments, user 1350 may speak a command as indicated by S1. This command may be received by microphone 1306. If no other acoustic information is present in the room, this alone may be sufficient to ensure accurate translation of the voice command S1. However, in various embodiments media management module 1318 or media processing device 1316 may be operative to generate or otherwise output acoustic information that is reproduced by acoustic reproduction devices 1360 and 1362 as signals S2 and S3 which may cause interface with the voice command S1. Similarly, other ambient noise S4 may also be present, such as noise from a pet 1354, another human being or any other source of unwanted ambient noise. To accurately act on the voice command S1, accurate speech recognition processing by media management module 1316 or by a media management module (not shown) of remote control device 1302 as described elsewhere herein and as described below with reference to FIG. 14 is required.

Figure 14:
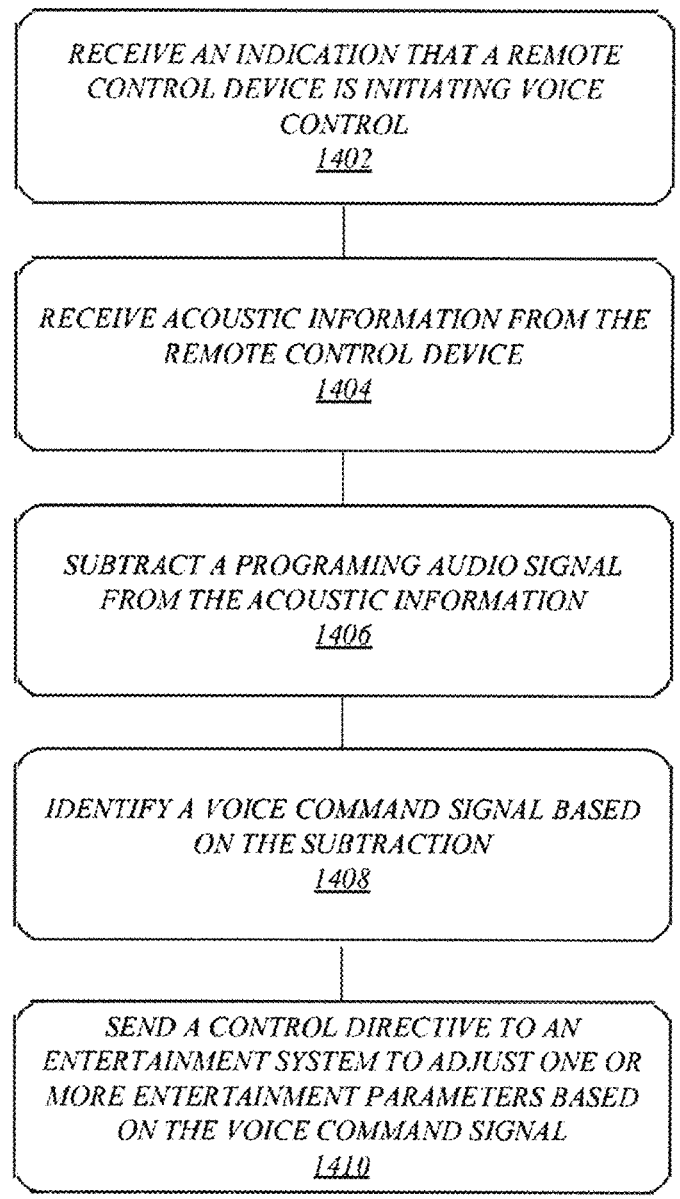
FIG. 14 illustrates one embodiment of a logic flow.

FIG. 14 illustrates one embodiment of a logic flow 1400. The logic flow 1400 may be representative of some or all of the operations executed by one or more embodiments described herein. In the illustrated embodiment shown in FIG. 14, the logic flow 1400 may receive an indication that a remote control device is initiating voice control at 1402. For example, based on the orientation or other initiating parameter, remote control device 1302 may provide a signal 1320 to media processing device 1316 indicating that voice control or speech recognition processing is being initiated.

In some embodiments, acoustic information may be received from the remote control device at 1404. For example, acoustic information 1320 may be sent from remote control device 1302 to media processing device 1316 in some embodiments. In various embodiments, the acoustic information may comprise a measured audio signal comprising a correlation of a first acoustic input received by a first microphone arranged on a first side of the remote control device and a second acoustic input received by a second microphone arranged on a second side of the remote control device opposite the first side. For example, acoustic information 1320 may comprise a combination or a differential of signals S1, S2, S3 and S4 received at microphones 1306 and 1308 of remote control device 1302 in some embodiments.

In various embodiments, a programming audio signal may be subtracted from the acoustic information at 1406. For example, the programming audio signal may comprise a known acoustic signal that was generated or reproduced by the entertainment system 1316. At 1408, in some embodiments, a voice command signal may be identified based on the subtraction and at 1410 a control directive may be sent to an entertainment system to adjust one or more entertainment parameters of the entertainment system based on the voice command signal. For example, system 1300 may be operative to identify and/or isolate voice command signal S1 and may be operative to send a control directive to one or more entertainment commands that may be controlled based on the voice command signal S. Other embodiments are described and claimed.

Figure 15:
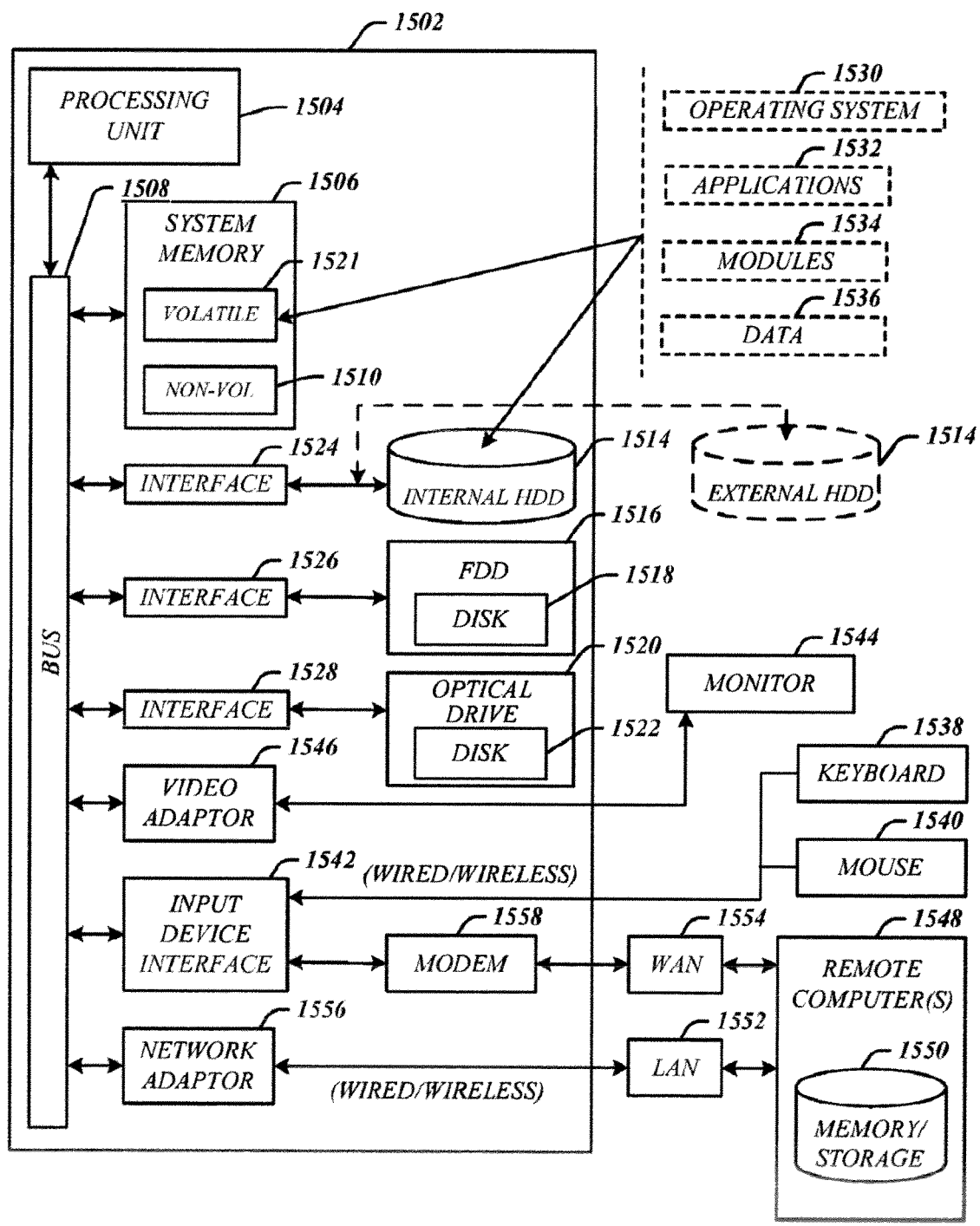
FIG. 15 illustrates one embodiment of a computing architecture.

FIG. 15 illustrates an embodiment of an exemplary computing architecture 1500 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

The one or more application programs 1532, other program modules 1534, and program data 1536 can include, for example, the [INSERT COMPONENTS].

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
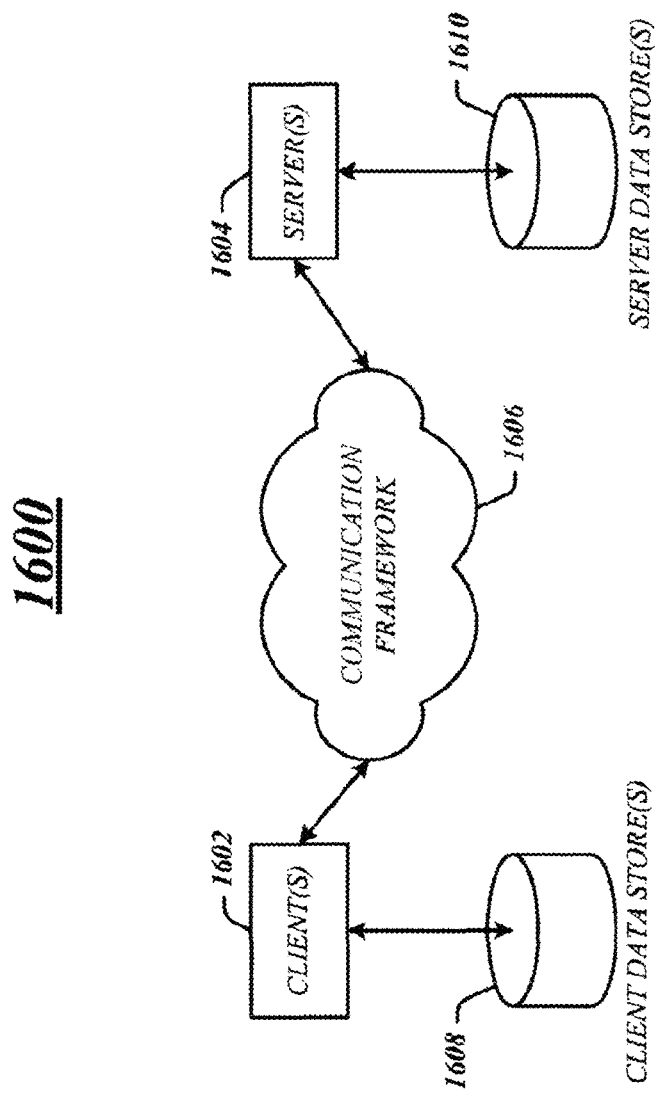
FIG. 16 illustrates one embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, and so forth. The embodiments, however, are not limited to implementation by the communications architecture 1600.

As shown in FIG. 16, the communications architecture 1600 comprises includes one or more clients 1602 and servers 1604. The clients 1602 may implement the client systems 310, 400. The servers 1604 may implement the server system 330. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols, such as those described with reference to systems 300, 400 and 1500. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system, comprising:
   an entertainment device, including first wireless interconnect circuitry; and
   a remote control, including:
      second wireless interconnect circuitry,
      a plurality of microphones including a first microphone and a second microphone,
      a processor circuit coupled to the plurality of microphones; and
      memory coupled to the processor circuit, the memory including instructions that when executed by the processor circuit, cause the processor circuit to:
         receive acoustic information from at least two of the plurality of microphones, the acoustic information including a first acoustic input from the first microphone and a second acoustic input from the second microphone, the first acoustic input including a voice command signal and the second acoustic input including an ambient noise signal,
         subtract the ambient noise signal from the voice command signal to generate an isolated voice command signal, and
         transmit, to the entertainment device via the second wireless interconnect circuitry, the isolated voice command signal, the entertainment device operative to receive the isolated voice command signal via the first wireless interconnect circuitry and to adjust one or more entertainment parameters based on the isolated voice command signal.

2. The system of claim 1, the first microphone including a directional microphone, the second microphone including an omnidirectional microphone, or the first microphone including a directional microphone and the second microphone including an omnidirectional microphone.

3. The system of claim 1, further including one or more sensors communicatively coupled to the processor circuit, the memory including instructions, which when executed by the processor circuit cause the processor circuit to receive the acoustic information based on information received from the one or more sensors.

4. The system of claim 3, the memory including instructions, which when executed by the processor circuit cause the processor circuit to receive the acoustic information based on a sensed direction of an axis of sensitivity for the plurality of microphones, based on an arrangement of the remote control, based on a position of the remote control, or based on a location of the remote control, wherein the one or more sensors include at least one of an accelerometer, a proximity sensor, a tilt sensor, an optical sensor, a pressure sensor, a thermal sensor, or an image sensor.

5. The system of claim 1, the acoustic information including a content acoustic signal and the memory including instructions, which when executed by the processor circuit cause the processor circuit to compare the content acoustic signal to a volume threshold.

6. The system of claim 5, the memory including instructions, which when executed by the processor circuit cause the processor circuit to send a volume increase request to the entertainment device if the content acoustic signal is less than or equal to the volume threshold or send a volume decrease request to the entertainment device if the content acoustic signal is greater than or equal to the volume threshold.

7. The system of claim 6, wherein the volume threshold is established based on a previously selected volume level.

8. The system of claim 1, the acoustic information including a content acoustic signal, the memory including instructions, which when executed by the processor circuit cause the processor circuit to:
 subtract the ambient noise signal from the content acoustic signal to generate an adjusted content acoustic signal;
 determine whether the adjusted content acoustic signal is greater than or equal to a volume threshold; and
 send a volume increase request to the entertainment device based on a determination that the adjusted content acoustic signal is not greater than or equal to the volume threshold; or
 send a volume decrease request to the entertainment device based on a determination that the adjusted content acoustic signal is greater than or equal to the volume threshold.

9. The system of claim 1, the acoustic information including a content acoustic signal, the memory including instructions, which when executed by the processor circuit cause the processor circuit to:
 compare the ambient noise signal to the content acoustic signal;
 determine whether a magnitude of the content acoustic signal is greater than or greater than or equal to a magnitude of the ambient noise signal; and
 send a volume increase request to the entertainment device based on a determination that the magnitude of the content acoustic signal is not greater than or equal to the magnitude of the ambient noise signal; or
 send a volume decrease request to the entertainment device based on a determination that the magnitude of the content acoustic signal is greater than or equal to the magnitude of the ambient noise signal.

10. A system, comprising:
 a remote control, including:
  first wireless interconnect circuitry, and
  a plurality of microphones including a first microphone and a second microphone; and
 an entertainment device, including:
  second wireless interconnect circuitry,
  a processor circuit coupled to the second wireless interconnect circuitry; and
  memory coupled to the processor circuit, the memory including instructions that when executed by the processor circuit, cause the processor circuit to:
   receive, from the remote control via the second wireless interconnect circuitry, acoustic information from at least two of the plurality of microphones, the acoustic information including a first acoustic input from the first microphone and a second acoustic input from the second microphone, the first acoustic input including a voice command signal and the second acoustic input including an ambient noise signal,
   subtract the ambient noise signal from the voice command signal to generate an isolated voice command signal, and
   adjust one or more entertainment parameters based on the isolated voice command signal.

11. The system of claim 10, the first microphone including a directional microphone, the second microphone including an omnidirectional microphone, or the first microphone including a directional microphone and the second microphone including an omnidirectional microphone.

12. The system of claim 10, including one or more sensors communicatively coupled to the processor circuit, the memory including instructions, which when executed by the processor circuit cause the processor circuit to receive the acoustic information based on information received from the one or more sensors.

13. The system of claim 12, the memory including instructions, which when executed by the processor circuit cause the processor circuit to receive the acoustic information based on a sensed direction of an axis of sensitivity for the plurality of microphones, based on an arrangement of the remote control, based on a position of the remote control, or based on a location of the remote control, wherein the one or more sensors including at least one of an accelerometer, a proximity sensor, a tilt sensor, an optical sensor, a pressure sensor, a thermal sensor, or an image sensor.

14. The system of claim 10, the acoustic information including a content acoustic signal and the memory including instructions, which when executed by the processor circuit cause the processor circuit to compare the content acoustic signal to a volume threshold.

15. The system of claim 14, the memory including instructions, which when executed by the processor circuit cause the processor circuit to send a volume increase request to the entertainment device if the content acoustic signal is less than or equal to the volume threshold or send a volume decrease request to the entertainment device if the content acoustic signal is greater than or greater than or equal to the volume threshold.

16. The system of claim 15, wherein the volume threshold is established based on a previously selected volume level.

17. The system of claim 10, the acoustic information including a content acoustic signal, the memory including instructions, which when executed by the processor circuit cause the processor circuit to:
 subtract the ambient noise signal from the content acoustic signal to generate an adjusted content acoustic signal;
 determine whether the adjusted content acoustic signal is greater than or equal to a volume threshold; and send a volume increase request to the entertainment device based on a determination that the adjusted content acoustic signal is not greater than or equal to the volume threshold; or send a volume decrease request to the entertainment device based on a determination that the adjusted content acoustic signal is greater than or equal to the volume threshold.

18. The system of claim 10, the acoustic information including a content acoustic signal, the memory including instructions, which when executed by the processor circuit cause the processor circuit to:

compare the ambient noise signal to the content acoustic signal;

determine whether a magnitude of the content acoustic signal is greater than or equal to a magnitude of the ambient noise signal; and send a volume increase request to the entertainment device based on a determination that the magnitude of the content acoustic signal is not greater than or equal to the magnitude of the ambient noise signal; or send a volume decrease request to the entertainment device based on a determination that the magnitude of the content acoustic signal is greater than or equal to the magnitude of the ambient noise signal.

19. A method comprising:

receiving, via a first microphone of a remote control, a first acoustic input comprising a voice command signal;

receiving, via a second microphone, a second acoustic input comprising an ambient noise signal;

subtracting, at processing circuitry, the ambient noise signal from the voice command signal to generate an isolated voice command signal; and adjusting one or more entertainment parameters of an entertainment device based on the isolated voice command signal.

20. The method of claim 19, the remote control including the first microphone and the second microphone.

21. The method of claim 19, the remote control including the first microphone and the entertainment device including the second microphone.

22. The method of claim 19, the first microphone including a directional microphone, the second microphone including an omnidirectional microphone, or the first microphone including a directional microphone and the second microphone including an omnidirectional microphone.

23. The method of claim 19, the first acoustic input including a content acoustic signal, the method including:

comparing, by the processing circuitry, the content acoustic signal to a volume threshold; and adjusting the one or more entertainment parameters including:

increasing a volume if the content acoustic signal is less than or equal to the volume threshold, or decreasing the volume if the content acoustic signal is greater than or equal to the volume threshold.

24. The method of claim 19, the second acoustic input including a content acoustic signal, the method including:

subtracting, by the processing circuitry, the ambient noise signal from the content acoustic signal to generate an adjusted content acoustic signal;

determining, by the processing circuitry, whether the adjusted content acoustic signal is greater than or equal to a volume threshold; and adjusting the one or more entertainment parameters including:

increasing a volume based on a determination that the adjusted content acoustic signal is not greater than or equal to the volume threshold, or decreasing the volume based on a determination that the adjusted content acoustic signal is greater than or equal to the volume threshold.

25. The method of claim 19, the second acoustic input including a content acoustic signal, the method including:

comparing, by the processing circuitry, the ambient noise signal to the content acoustic signal;

determining, by the processing circuitry, whether a magnitude of the content acoustic signal is greater than or equal to a magnitude of the ambient noise signal; and adjusting the one or more entertainment parameters including:

increasing a volume based on a determination that the magnitude of the content acoustic signal is not greater than or equal to the magnitude of the ambient noise signal, or decreasing the volume based on a determination that the magnitude of the content acoustic signal is greater than or equal to the magnitude of the ambient noise signal.

26. The method of claim 19, the remote control including the processing circuitry.

27. The method of claim 19, the entertainment device including the processing circuitry.

* * * * *